(12) United States Patent
Eash et al.

(10) Patent No.: US 11,650,663 B2
(45) Date of Patent: *May 16, 2023

(54) REPOSITIONABLE FOVEAL DISPLAY WITH A FAST SHUT-OFF LOGIC

(71) Applicant: Avegant Corp., San Mateo, CA (US)

(72) Inventors: Aaron Matthew Eash, San Francisco, CA (US); Andrew John Gross, Chassell, MI (US); Baker Ngan, San Francisco, CA (US); Edward Chia Ning Tang, Menlo Park, CA (US); Joseph Roger Battelle, Belmont, CA (US); Warren Cornelius Welch, III, Foster City, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,194

(22) Filed: Sep. 20, 2021

(65) Prior Publication Data

US 2022/0075448 A1    Mar. 10, 2022

Related U.S. Application Data

(63) Continuation of application No. 16/735,596, filed on Jan. 6, 2020, now Pat. No. 11,126,261.

(Continued)

(51) Int. Cl.
   *G06F 3/01*    (2006.01)
   *G06T 11/00*   (2006.01)
   *G06T 11/60*   (2006.01)

(52) U.S. Cl.
   CPC ............ *G06F 3/013* (2013.01); *G06T 11/001* (2013.01); *G06T 11/60* (2013.01)

(58) Field of Classification Search
   CPC ........ G06F 3/013; G06F 3/147; G06T 11/001; G06T 11/60; G02B 2027/0134;
   (Continued)

(56) References Cited

U.S. PATENT DOCUMENTS

| 4,924,522 A | 5/1990 | Bray et al. |
| 5,035,500 A | 7/1991 | Rorabaugh et al. |

(Continued)

FOREIGN PATENT DOCUMENTS

| EP | 1970887 A1 | 9/2008 |
| JP | 08-313843 A | 11/1996 |

(Continued)

OTHER PUBLICATIONS

Non-Final Office Action, U.S. Appl. No. 16/735,596, dated Feb. 4, 2021, 16 pages.

(Continued)

*Primary Examiner* — Jacinta M Crawford
(74) *Attorney, Agent, or Firm* — Nicholson De Vos Webster & Elliott LLP; Judith Szepesi

(57) ABSTRACT

A system including a rendering engine to render a field texture for a field display and a foveal texture for a steerable foveal display and a compositor including a field compositor to generate frames for the field display from the field texture and a foveal compositor to generate frames for the foveal display from the foveal texture. The system further including a composition manager designed to sequence and select what is presented including one or more of data in the field display and the foveal display.

20 Claims, 9 Drawing Sheets

Related U.S. Application Data

(60) Provisional application No. 62/847,314, filed on May 13, 2019, provisional application No. 62/789,511, filed on Jan. 7, 2019.

(58) Field of Classification Search
CPC .......... G02B 2027/014; G02B 27/0093; G02B 27/0172; G09G 5/14; G09G 5/391; G09G 2320/0261; G09G 2320/0686; G09G 2340/00; G09G 2340/0407; G09G 2340/045; G09G 2340/10; G09G 2340/12
USPC .................................................. 345/582, 633
See application file for complete search history.

(56) References Cited

U.S. PATENT DOCUMENTS

| | | | |
|---|---|---|---|
| 6,008,781 A | 12/1999 | Furness et al. | |
| 6,097,353 A | 8/2000 | Melville et al. | |
| 6,353,503 B1 | 3/2002 | Spitzer et al. | |
| 6,356,392 B1 | 3/2002 | Spitzer | |
| 7,786,648 B2 | 8/2010 | Xu et al. | |
| 9,128,281 B2 | 9/2015 | Osterhout et al. | |
| 9,335,548 B1 | 5/2016 | Cakmakci et al. | |
| 9,588,408 B1 | 3/2017 | Linnell | |
| 9,710,887 B1 | 7/2017 | Sahlsten et al. | |
| 9,711,072 B1 | 7/2017 | Konttori et al. | |
| 9,711,114 B1 | 7/2017 | Konttori et al. | |
| 9,779,478 B1 | 10/2017 | Wilson et al. | |
| 9,972,071 B2 | 5/2018 | Wilson et al. | |
| 10,140,695 B2 | 11/2018 | Wilson et al. | |
| 10,255,714 B2 | 4/2019 | Mitchell et al. | |
| 10,284,118 B2 | 5/2019 | Henderson et al. | |
| 10,514,546 B2 | 12/2019 | Eash et al. | |
| 11,209,650 B1 | 12/2021 | Trail | |
| 2008/0015553 A1 | 1/2008 | Zacharias | |
| 2009/0122385 A1 | 5/2009 | Hilton | |
| 2009/0160872 A1 | 6/2009 | Gibbons | |
| 2010/0097580 A1 | 4/2010 | Yamamoto et al. | |
| 2010/0149073 A1 | 6/2010 | Chaum et al. | |
| 2010/0231706 A1 | 9/2010 | Maguire, Jr. | |
| 2011/0075257 A1 | 3/2011 | Hua et al. | |
| 2011/0141225 A1 | 6/2011 | Stec et al. | |
| 2012/0120498 A1 | 5/2012 | Harrison et al. | |
| 2012/0154277 A1 | 6/2012 | Bar-Zeev et al. | |
| 2012/0176483 A1 | 7/2012 | Border et al. | |
| 2013/0100176 A1 | 4/2013 | Lewis et al. | |
| 2013/0114146 A1 | 5/2013 | Larson | |
| 2013/0208003 A1 | 8/2013 | Bohn et al. | |
| 2013/0208330 A1 | 8/2013 | Naono | |
| 2013/0286053 A1 | 10/2013 | Fleck et al. | |
| 2014/0300859 A1 | 10/2014 | Oz | |
| 2015/0201171 A1 | 7/2015 | Takehana | |
| 2015/0247723 A1 | 9/2015 | Abovitz et al. | |
| 2015/0287165 A1 | 10/2015 | Berghoff | |
| 2016/0026253 A1 | 1/2016 | Bradski et al. | |
| 2016/0033771 A1 | 2/2016 | Tremblay et al. | |
| 2016/0065921 A1 | 3/2016 | Sieler et al. | |
| 2016/0131912 A1 | 5/2016 | Border et al. | |
| 2016/0209648 A1 | 7/2016 | Haddick et al. | |
| 2016/0225192 A1 | 8/2016 | Jones et al. | |
| 2016/0233793 A1 | 8/2016 | Henderson et al. | |
| 2016/0240013 A1 | 8/2016 | Spitzer | |
| 2016/0260258 A1 | 9/2016 | Lo et al. | |
| 2016/0262608 A1 | 9/2016 | Krueger | |
| 2016/0267716 A1 | 9/2016 | Patel | |
| 2016/0274365 A1 | 9/2016 | Bailey et al. | |
| 2016/0327789 A1 | 11/2016 | Klug et al. | |
| 2016/0363841 A1 | 12/2016 | Hino et al. | |
| 2016/0379606 A1 | 12/2016 | Kollin et al. | |
| 2017/0083084 A1 | 3/2017 | Fatsuta et al. | |
| 2017/0124760 A1 | 5/2017 | Murakawa et al. | |
| 2017/0188021 A1 | 6/2017 | Lo et al. | |
| 2017/0245753 A1 | 8/2017 | Donaldson | |
| 2017/0255012 A1 | 9/2017 | Fam et al. | |
| 2017/0255020 A1 | 9/2017 | Fam et al. | |
| 2017/0263046 A1 | 9/2017 | Patney et al. | |
| 2017/0287446 A1 | 10/2017 | Young et al. | |
| 2017/0287447 A1 | 10/2017 | Barry et al. | |
| 2017/0316601 A1 | 11/2017 | Kakarlapudi et al. | |
| 2017/0318235 A1 | 11/2017 | Schneider et al. | |
| 2018/0003962 A1 | 1/2018 | Urey et al. | |
| 2018/0096471 A1 | 4/2018 | Wilson et al. | |
| 2018/0136471 A1 | 5/2018 | Miller et al. | |
| 2018/0183356 A1 | 6/2018 | Henderson et al. | |
| 2018/0227630 A1 | 8/2018 | Sengelaub et al. | |
| 2018/0269266 A1 | 9/2018 | Ahmed et al. | |
| 2018/0275410 A1 | 9/2018 | Yeoh et al. | |
| 2018/0284451 A1 | 10/2018 | Eash et al. | |
| 2018/0293041 A1 | 10/2018 | Harviainen | |
| 2018/0321484 A1 | 11/2018 | Bailey et al. | |
| 2018/0344413 A1 | 12/2018 | Rappel et al. | |
| 2020/0018965 A1 | 1/2020 | Milner-Moore et al. | |
| 2020/0133006 A1 | 4/2020 | Eash et al. | |
| 2020/0271932 A1 | 8/2020 | Tuomisto et al. | |

FOREIGN PATENT DOCUMENTS

| | | |
|---|---|---|
| JP | 2001-281594 | 10/2001 |
| JP | 2007-171228 A | 7/2007 |
| JP | 2009-182754 A | 8/2009 |
| JP | 2014-511512 A | 5/2014 |
| JP | 2015-503934 A | 2/2015 |
| JP | 2017-028510 A | 2/2017 |
| WO | 2012/082807 A2 | 6/2012 |
| WO | 2013/035086 A1 | 3/2013 |
| WO | 2018/019831 A1 | 2/2018 |
| WO | 2018/165484 A1 | 9/2018 |

OTHER PUBLICATIONS

Notice of Allowance, U.S. Appl. No. 16/735,596, dated May 26, 2021, 9 pages.
PCT Written Opinion PCT/US2020/012428, dated Mar. 31, 2020, 6 pages.
Notice of Reasons for Refusal, JP App. No. 2019-553025, dated Mar. 2, 2022, 11 pages (6 pages of English Translation and 5 pages of Original Document).
Non Final Office Action, U.S. Appl. No. 16/835,032, dated Jun. 6, 2022, 13 pages.
European Search Report and Search Opinion, EP App. No. 20739198.8, dated Aug. 9, 2022, 15 pages.
Notice of Reasons for Refusal, JP App. No. 2021-538384, Feb. 28, 2023, 19 pages (10 pages of English Translation and 9 pages of Original Document).
Office Action, KR App. No. 10-2021-7024243, Mar. 9, 2023, 15 pages (5 pages of English Translation and 10 pages of Original Document).

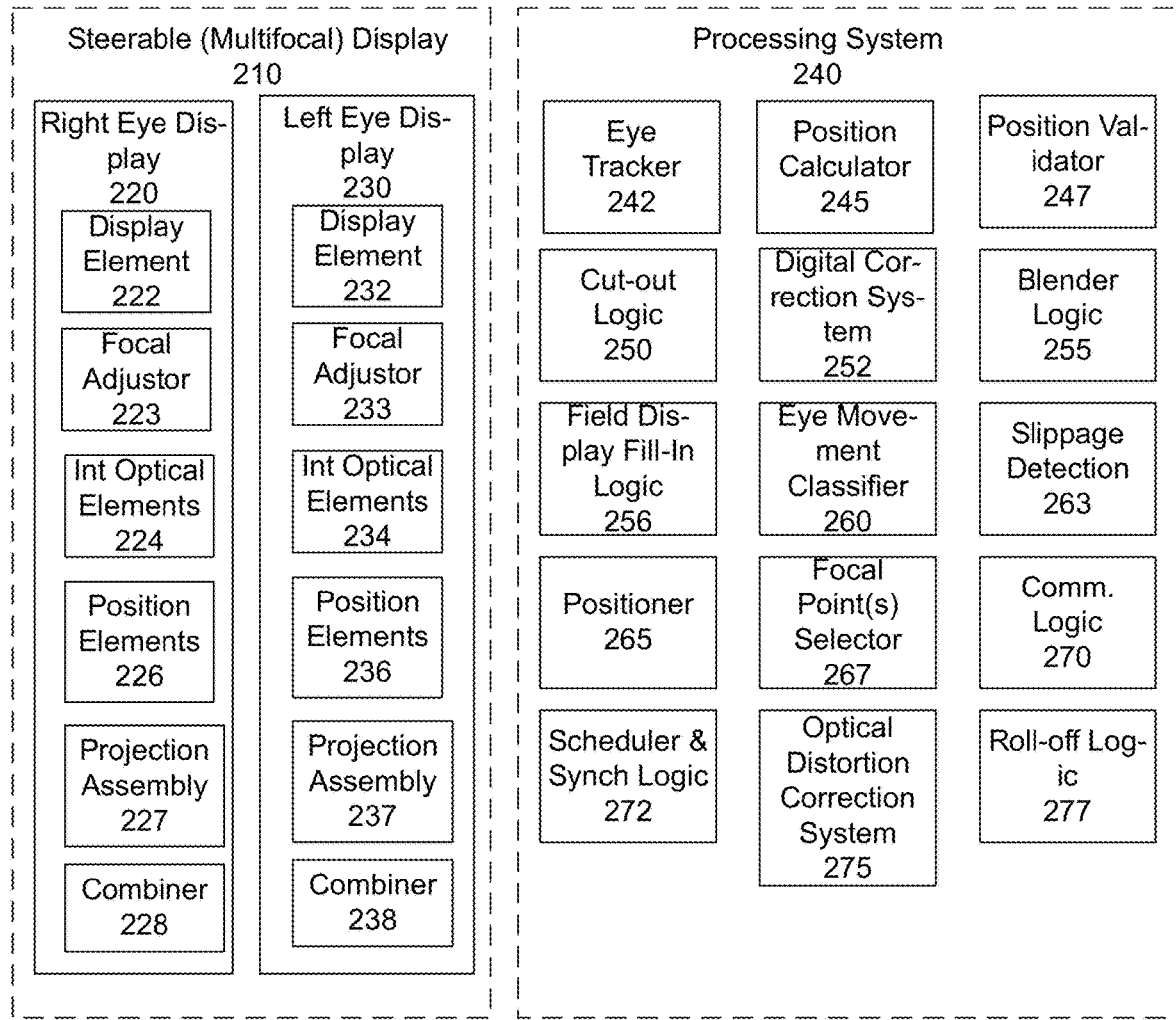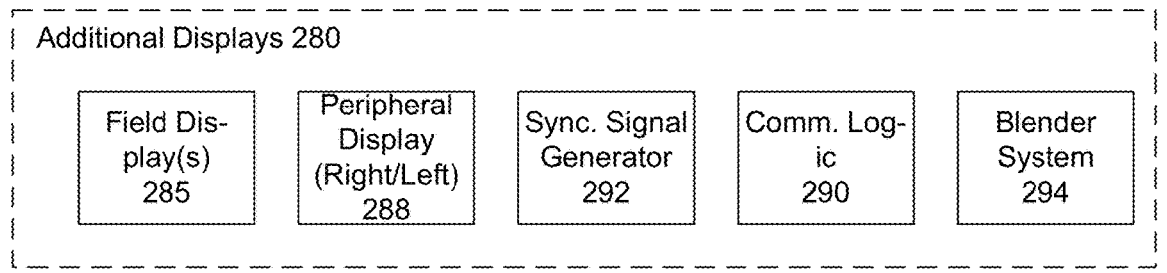
Fig. 2

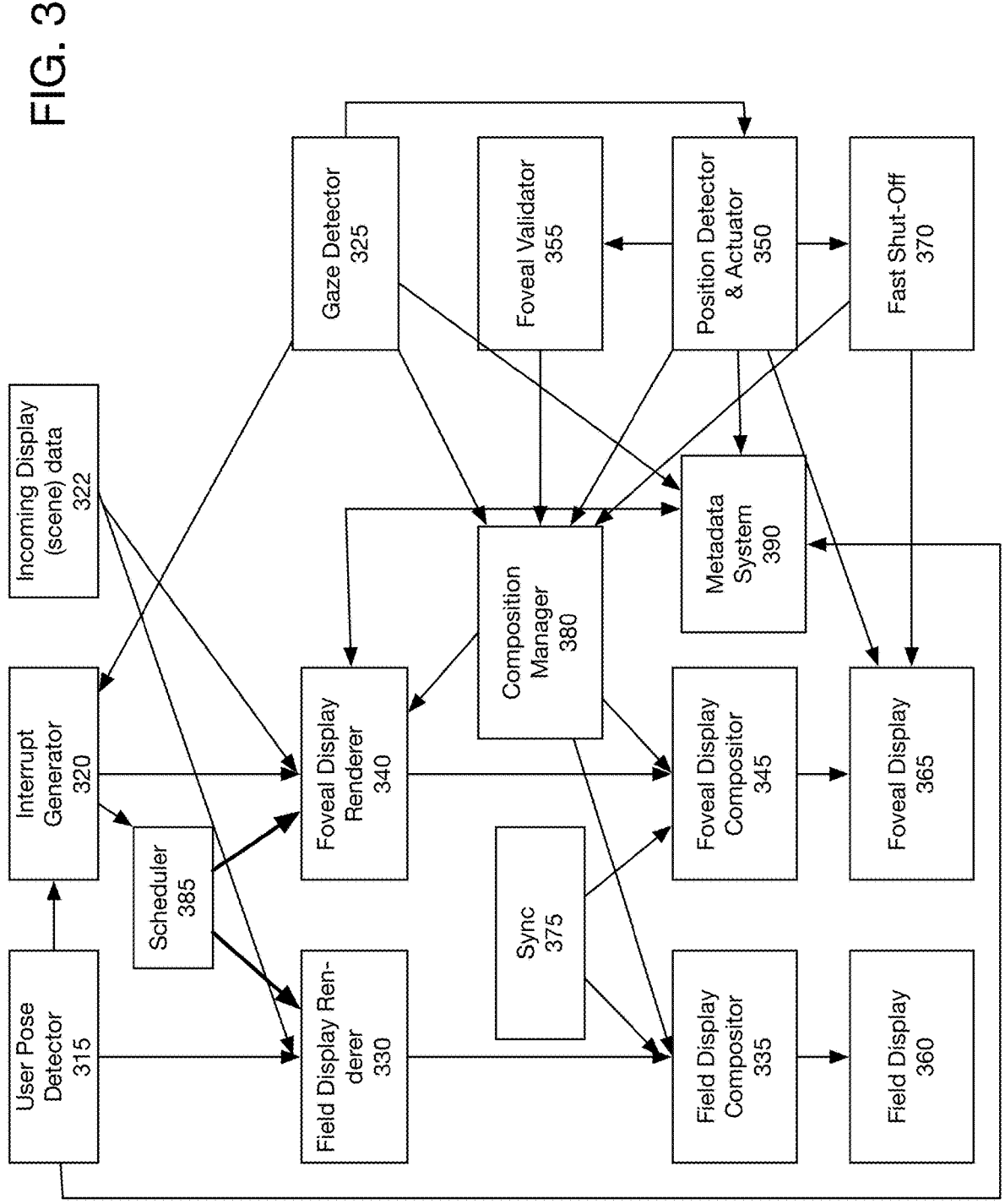

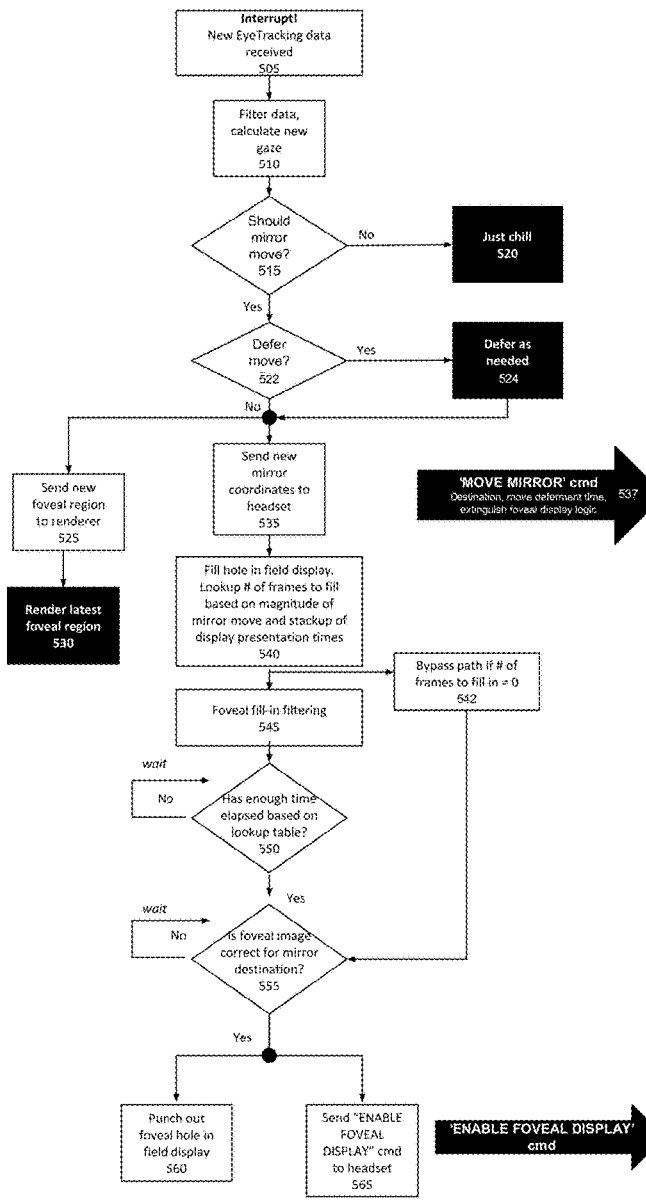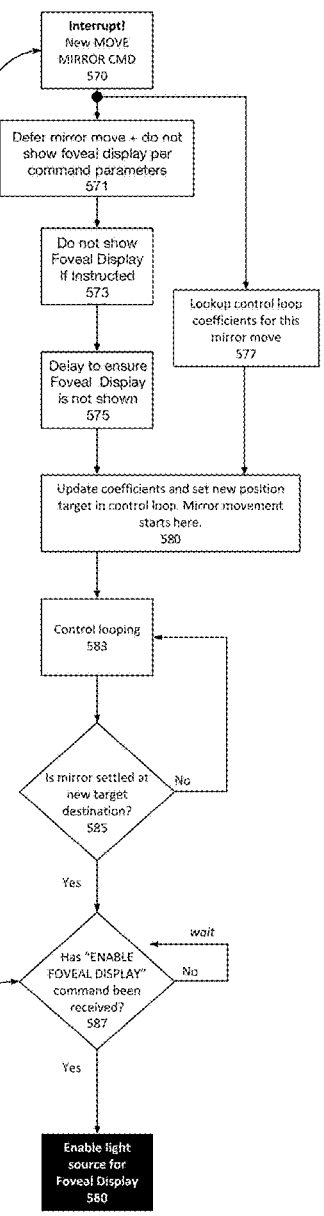
FIG. 5A
FIG. 5B

REPOSITIONABLE FOVEAL DISPLAY WITH A FAST SHUT-OFF LOGIC

RELATED APPLICATIONS

The present application is a continuation of U.S. application Ser. No. 16/735,596, filed Jan. 6, 2020, issuing as U.S. Pat. No. 11,126,261, on Sep. 21, 2021, which claims priority to U.S. Provisional Patent Application No. 62/789,511, filed on Jan. 7, 2019, and U.S. Provisional Patent Application No. 62/847,314, filed on May 13, 2019. All applications are incorporated herein in their entirety.

FIELD

The present invention relates to displays and more particularly to steerable displays.

BACKGROUND

Near-eye displays have the competing requirements of displaying images at a high resolution, over a large field of view (FOV). For many applications in virtual and augmented reality, the field of view should be greater than 90 degrees, and ideally the binocular field of view would extend past 180 degrees. At the same time, the resolution of the display should match that of the human visual system so that little or no pixelation is perceived in the virtual images. Combining these two requirements in a single system presents a number of challenges.

Additionally, optical systems that can project wide FOV images to the user with sufficiently high resolution over the entire field of view are also difficult to design due to timing issues.

BRIEF DESCRIPTION OF DRAWINGS

The present invention is illustrated by way of example, and not by way of limitation, in the figures of the accompanying drawings and in which like reference numerals refer to similar elements and in which:

FIG. 2 is a block diagram of one embodiment of the rendering engine.

FIG. 3 is a block diagram of one embodiment of the rendering engine and compositor systems.

FIGS. 5A-5B are flowcharts of one embodiment of the eye tracking and mirror control in the system.

DETAILED DESCRIPTION

Figure 1:
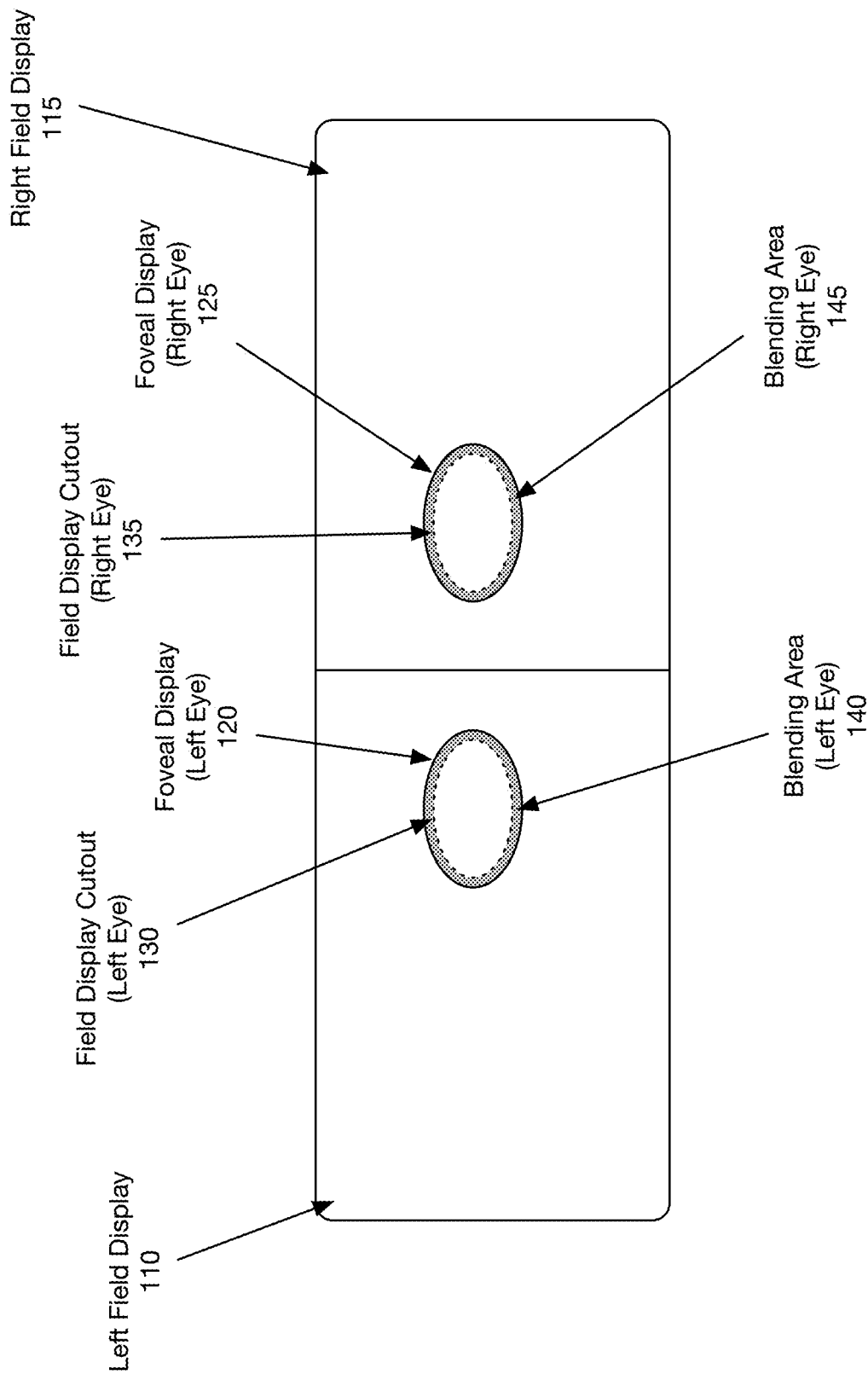
FIG. 1 is an overview image for one embodiment of a system in which the rendering engine may be implemented.

The present application discloses a control system and rendering pipeline for a system which includes a foveated display. A foveal display is, in one embodiment, a steerable display which may be positioned to display a smaller, higher resolution image, which is generally positioned to match the user's retinal fovea. Human eyes perceive much higher resolution at the fovea, and the ability to perceive resolution drops rapidly away from that area. Therefore, targeting a smaller field of view (FOV) high-resolution display to the foveal area, with a lower resolution display covering the rest of the field of view provides the perception of a high-resolution display over the entire FOV. Although the term "foveated display" or "foveal display" is used in the present application, and in one embodiment, the display is targeted at the user's foveal area, in other embodiments the steerable display disclosed may be positioned elsewhere within the user's field of view.

In one embodiment, the foveal display is paired with a field display which provides a lower resolution display over a wider field of view. In one embodiment, a region corresponding to the display area (position and size) of the foveal display is cut out of the field display, and the edges between the foveal and field displays are blended.

One embodiment of implementing such a foveated image is described in U.S. Pat. No. 10,514,546, issued on Dec. 24, 2019, which is incorporated herein by reference.

In order to enable such a display, the system must match the image displayed by the field display with the image displayed by the steerable display in position as well as brightness and tone. If there is a mismatch that is perceived by the user, it can be perceived as blurriness, flashing, or other optical artifacts which diminish the user's experience. The present control system and rendering pipeline in one embodiment enables the creation of such synchronized presentations. In one embodiment, the rendering of the field display, and foveal display may be asynchronous. In one embodiment, they may have different frame rates. However, the timing of the elements is such that the user perceives the presentation seamlessly. In this context the term "presentation" indicates the viewer's perception of the visual image, or series of images, displayed to the user, which may be displayed through a combination of a field display and a foveal display.

System architectures that are able to present the user with high resolution images over a wide field of view, while simultaneously reducing the rendering, data rate, and panel requirements will enable new applications for augmented and virtual reality systems.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional and other changes may be made without departing from the scope of the present invention. The following detailed description is, therefore, not to be taken in a limiting sense, and the scope of the present invention is defined only by the appended claims.

FIG. 1 illustrates the arrangement of a hybrid display which includes a field display and a foveal display. In one embodiment, the field display 110, 115 may be a separate field display for the right eye 115 and the left eye 110. In another embodiment, the field display 110, 115 may be a single display across both eyes.

The field display 110, 115 has a cut-out 130, 135, and a foveal display 120, 125 is inserted into the cut-out. The foveal display 120, 125 is steerable and positioned based on the user's gaze, in one embodiment. In one embodiment, the foveal display 120, 125 is steerable and its position is based upon scene content, environmental elements, an event, and/or other factors.

There is blending 140, 145 between the field display 110, 115 and the foveal display 120, 125. The blending 140, 145 ensures that the transition between the field display 110, 115 and foveal display 120, 125 is smooth and not jarring. The blending, in one embodiment, may include alpha mask-based blending, dithering, temporal multi-sample anti-aliasing, spatial anti-aliasing, blurring, as well as adjustments in brightness, color, etc.

In one embodiment, the blending region 140, 145 is dynamic in size and/or shape. In one embodiment, the size and/or shape of the foveal region 120, 125 may be adjustable. In one embodiment, the size and/or shape of the foveal region 120, 125 may be changed due to a variety of factors including scene content, user behavior, optomechanical characteristics of the system, eye tracking performance across the viewing range, etc.

FIG. 2 illustrates one embodiment of the exemplary optical system 210, 280 and associated processing system 240. In one embodiment, the processing system may be implemented in a computer system including a processor. In one embodiment, the processing system 240 may be part of the display system. In another embodiment, the processing system 240 may be a separate system, which may be local or remote to the optical system.

In one embodiment, the displays 210, 280 may be implemented in a wearable device, such as a head mounted display.

A steerable display image is presented to the user's eye through a right eye steerable display 220 and left eye steerable display 230. In one embodiment, the steerable displays 220, 230 direct the steerable display image primarily toward the center of the field of view of the user's eye. In another embodiment, the steerable displays may place the foveal image in a position other than the center of the field of view of the user's eye. In one embodiment, the position may be fixed relative to the user's head position, fixed relative to one or more environmental elements, fixed relative to gaze, etc. In one embodiment, the foveal image position may be based on scene content, environmental elements, events, and/or other factors. In one embodiment, the image may be directed to a different location, as will be described below. The steerable display image is a high-resolution image with a limited field of view, in one embodiment.

In one embodiment, the steerable display image is a variable resolution image. In one embodiment, the variable resolution is highest in the center of the display. In one embodiment, the change in the resolution corresponds to the change in the maximum resolution perceived by the user's eye, which drops off as it moves further from the center of the fovea. In one embodiment, the variable resolution image has discrete zones of resolution, with a first highest resolution zone in the center, and one or more lower resolution zones further from the center. In one embodiment, the lower resolution zones are concentric to the highest resolution zone.

In one embodiment, the steerable display may be a multi-focal display. In a multifocal display, in one embodiment, a sequence of images at different focal distances is displayed sufficiently rapidly such that the user perceives a single multi-focal image. In another embodiment, in a multifocal display images are projected at multiple focal distances simultaneously. In either case, the image with multiple focal distances is perceived by the user as a single multi-focal image.

The elements described below for the right eye display 220 are duplicated for the left eye display 230, in one embodiment. The image for the right eye is created using a first display element 222. In one embodiment, the display element is a digital micromirror device (DMD). In one embodiment, the display element 222 is a scanning micromirror device. In one embodiment, the display element 222 is a scanning fiber device. In one embodiment, the display element 222 is an organic light-emitting diode (OLED). In one embodiment, the display element 222 is a liquid crystal on silicon (LCOS) panel. In one embodiment, the display element 222 is a liquid crystal display (LCD) panel. In one embodiment, the display element 222 is a micro light emitting diode (μLED) panel. In one embodiment, the display element is a scanned laser system. Other types of display elements, currently used or developed in the future, may be used with the present system. The left eye display 230 matches the right eye display, in one embodiment.

In one embodiment, the display elements 222 may include a combination of such elements, or alternative elements that can be used to generate a high-resolution image for display to the user. FIG. 3 below discusses some embodiments of the display elements in more detail.

In one embodiment, the first display element 222 is located in a near-eye device such as glasses or goggles. In one embodiment, for a multi-focal steerable display 210, the displays 220 may also include a focal adjustor 223 which adjusts the focal distances for one or more portions of the image in the multi-focal display while the images are displayed. This adjustment may be temporal, or position based. In one embodiment, the OPLE system described in U.S. Pat. No. 10,187,634 may be used to implement the focal adjustors 223 for an adjustable multi-focal display.

In one embodiment, the focus and field of view for the steerable display are set using intermediate optical elements 224. The intermediate optical elements 224 may include but are not limited to, lenses, mirrors, holographic optical elements, and diffractive optical elements (DOEs).

In one embodiment, the field of view may be adjustable in size and/or shape. In one embodiment, the size and/or shape of the foveal region may be adjustable. In one embodiment, the size and/or shape of the foveal region may be changed due to a variety of factors including scene content, user behavior, optomechanical characteristics of the system, eye tracking performance across the viewing range, etc.

In one embodiment, for a single focus display, the focus of the virtual image displayed by display 220 is set to infinity. In another embodiment, the focus of the virtual image is set closer than infinity. In one embodiment, the focus of the virtual image can be changed. In one embodiment, as discussed above, the virtual image is multi-focal and has two or more focal distances perceived simultaneously.

In one embodiment, the steerable display image is directed primarily toward the center of the field of view of the user's eye. As discussed above, the system may alternatively be directed at a different position. The positioning of the steerable display image may be based on eye tracking data, scene content, environmental elements, events, etc., as will be discussed below.

In one embodiment, the field of view (FOV) of the steerable display image is greater than 1 degree. In one embodiment, the FOV of the steerable display image is between 1 degree and 20 degrees. In one embodiment, the range of movement is +/−20 degrees, and the field of view is 20 degrees, leading to a total display range of 60 degrees.

In one embodiment, the image data generated for the steerable display may be larger than the displayed size of the image to address inaccuracies in eye tracking, to provide the region needed to blend the foveal display with a field display so the user cannot perceive the blending, and/or to account for the time it takes to reposition the steerable display for the various types of eye movements. In one embodiment, the size of the field of view of the steerable display is greater than 5 degrees. The system in one embodiment is designed to account for latencies in the display system and changes to the user's gaze position that may happen between frame updates, and for latencies in the eye tracking system and the amount the user's gaze vector can change between updated reports from the eye tracker. The timing that enables these aspects will be discussed in more detail below.

In one embodiment, the system further includes a field display 280, or a pair of field displays one for each eye, to display a field display image with a field of view between 20-220 degrees. In one embodiment, the field display is a lower resolution display. A lower resolution display, in one embodiment, refers to a display with a lower pixel density, e.g., fewer pixels per viewing degree (PPD). The term PPD in this context refers to the average pixel per degree in a display. In some embodiments, the steerable display may have a variable number of pixels per degree. In this embodiment, the PPD of the steerable display at the outside of the steerable display may be lower than the PPD of the field display. However, the average pixels per degree in the display in one embodiment are higher for the steerable display than the field display. Because the field display is larger, there may be a larger total number of pixels in the field display than the steerable display, in some embodiments.

In one embodiment, the field display may not be lower resolution than the steerable display. In one embodiment, the difference between the steerable display and the field display may include, in addition to or instead of a lower resolution, one or more of: lower color depth, reduced color gamut, lower color resolution, reduced contrast, lacking multi-focal aspects, different sharpness, or any other display aspect which reduces the perceived quality of the image on the field display, compared to the steerable display. The term "lower grade" is used to refer to the difference between the steerable display and field display, in which the perceived quality of the image projected by the field display is lower than the perceived quality of the image projected by the steerable display.

In one embodiment, the steerable display image is positioned using a set of one or more positioning elements 226. In one embodiment, the positioning elements 226 include a steerable mirror. In one embodiment, the positioning elements 226 may include one or more of a curved mirror, a Fresnel reflector, a diffractive element. In one embodiment, the diffractive element is a surface relief grating. In one embodiment, the diffractive element is a volume hologram.

Projection assembly 227 projects the image from the right eye display 220.

In one embodiment, the display 220 also includes a combiner 228, to project the image to the user's eye. In one embodiment, the combiner 228 includes a waveguide. In one embodiment, the waveguide is a multilayer waveguide. The combiner 228 may include other elements which enable the steerable display to reach the user's eye. In one embodiment, the combiner 228 combines the steerable image from projection assembly 227 and a field display image 285 to present the hybrid image to the user using a fully or partially transparent optical system. In one embodiment, the combiner 228 is a partially transparent system which includes a waveguide. In one embodiment, this partially transparent system includes a partial mirror which may be flat or have optical power. In one embodiment, this partially transparent system includes a diffractive optical element. In one embodiment, this partially transparent system includes a holographic optical element. In one embodiment, this image is presented to the user through a direct view optical system. In one embodiment, this partially transparent system includes inclusions to reflect or scatter light.

A similar set of elements are present for the left eye steerable display 230. In one embodiment, the right eye steerable display 220 and the left eye steerable display 230 are matched. In another embodiment, they may include different elements. In one embodiment, they may be adjusted for the user's eyes, so that they are perceptually matched; that is, the user perceives them as matched. In one embodiment, the right and left displays 220, 230 create stereopsis to create or enhance the illusion of depth in an image, as is conventionally known.

In one embodiment, an eye tracker 242 tracks the gaze vector of the user, e.g. where the eye is looking. In one embodiment, the eye tracker is a camera-based eye tracking system 242. In one embodiment, the camera-based eye tracking system 242 includes a holographic optical element. In one embodiment, eye tracking system 242 is an infrared scanning laser with a receiving sensor. In one embodiment, the infrared scanning laser eye-tracking system 242 includes a holographic optical element. In one embodiment, eye tracking system 242 is an optical flow sensor. Other eye tracking mechanisms may be used for eye tracker 242. Position calculator 245 determines a center of the user's field of view based on data from the eye tracker 242. In one embodiment, the user's center of field of view is determined for each eye.

In one embodiment, the adjustable positioning elements 226, 236 of the steerable display 210 are used to adjust the positions of the right and left eye steerable displays 220, 230 based on the data from the eye tracker 242, to position the image to be directed primarily toward the center of the field of view of the user's eye. In one embodiment, the adjustable position elements 226, 236 are used to adjust the right and left eye steerable display 220, 230 to position the eye box or exit pupil toward the center of the field of view of the user's eye.

In one embodiment, the position of the steerable display image is adjusted by changing the angle of a mirror, one of the position elements 226. In one embodiment, the angle of the mirror is changed using electromagnetic force. In one embodiment, the angle of the mirror is changed using electrostatic force. In one embodiment, the angle of the mirror is changed using piezoelectric force. In one embodiment, the position element 226 is the image source, or display element 222 which is moved to position the image. In another embodiment, rather than using a mirror, the foveal image is steered using a computer-generated hologram implemented on a spatial light modulator. Although the word "steering" is used, in one embodiment, no element is physically moved. Rather, the reflective properties of a position element 226 or one of the elements in the display are adjusted to change the location of the output of the displays 220, 230. In one embodiment this is accomplished through the use of a spatial light modulator (SLM).

In one embodiment, additional displays 280 communicate with the processing system 240 via communication logics 270, 290. In one embodiment, the additional displays include a field display 285. In one embodiment, the additional displays include separate field displays 285 for the right and left eye. In one embodiment, the additional displays 280 may include a single field display 285 viewed by both eyes of the user.

In one embodiment, the additional displays 280 may have variable resolution. In one embodiment, the resolution drops off toward away from the center of the field display 285, corresponding to the drop in the maximum perceived resolution by the eye.

In one embodiment, the additional display 280 is a microLED (light emitting diode) or a microLED array. In one embodiment, the additional display 280 is an OLED (organic LED) array. In one embodiment, the additional display 280 uses a scanned laser. In one embodiment, the additional display 280 is an LCD (liquid crystal display) panel. In one embodiment the additional display 280 is an LCOS (liquid crystal on silicon) display. In one embodiment, the additional display is a DLP (digital light processing) display.

In one embodiment, when the field display 285 is a separate system, a sync signal generator 292 is used to synchronize the display of the independent steerable display 210 with the display of the field display 285. This is discussed in more detail below.

In one embodiment, the sync signal generator 292 is a signal that synchronizes the presentation of the displays. In one embodiment, the sync signal generator 292 is used to synchronize the adjustable mirror, or other positioning element 226, 236 of the steerable display 210 with the field display 285. In one embodiment, the sync signal generator 292 controls a fast shut-off mechanism that is used to temporarily disable a light source which is part of the projection assembly 227, 237 of the steerable display. This results in the synchronization of the displays 210, 285. This timing will be described in more detail below.

In one embodiment, additional display 280 includes blender system 294 to blend the edges of the steerable display image with the field display image to ensure that the transition is smooth, and imperceptible to the user.

In one embodiment, the field display image is presented to the user using a fully or partially transparent optical system. In one embodiment, combiner 228 combines the images from the steerable display and the field display, for presentation to the user. In one embodiment, the combiner 228 is a partially transparent system which includes a waveguide optical system. In one embodiment, this partially transparent system includes a partial mirror which may be flat or have optical power. In one embodiment, this partially transparent system includes a diffractive optical element. In one embodiment, this image is presented to the user through a direct view optical system. In one embodiment, this partially transparent system includes inclusions to reflect or scatter light.

In one embodiment of the additional displays 280, a display sub-system is used to display images in the region of monovision, referred to as the peripheral display 288. In one embodiment, the peripheral display 288 may be two separate displays, for the right and left eyes. In another embodiment, there may only be a peripheral display 288 on one side.

In one embodiment, the peripheral display 288 is one or more discrete LEDs. In one embodiment, the peripheral display 288 is used as an indicator, alert mechanism, or feedback mechanism, rather than a full display. The peripheral display image may be used to grab the user's attention, or subtly communicate information. For example, a peripheral display 288 may be used to indicate to the user that he or she should pay attention to a real-world event, which otherwise may not be noticeable while using the display system 200. In one embodiment, the use of such a peripheral display 288 is optional and may be set by the user.

In one embodiment, the additional displays sub-system 280 has no intermediate optical elements to manipulate the FOV or focus of the image. In another embodiment, this sub-system 280 includes intermediate optical elements. In one embodiment, intermediate optical elements may include a micro-lens array.

The image data displayed by the steerable display 210 and field display 285 are generated by processing system 240. In one embodiment, the processing system 240 is distributed, with various subsystems completing different aspects of the total system processing. In one embodiment, the processing system 240 may include a plurality of processors.

In one embodiment, the processing system 240 includes an eye tracker 242. In one embodiment, an eye tracker 242 tracks the gaze vector of the user, e.g. where the eye is looking. In one embodiment, the eye tracking system is a camera-based eye tracking system 242. Alternately, eye tracker 242 may be infrared laser based. Position calculator 245 determines a center of the user's field of view based on data from the eye tracker 242.

In one embodiment, the position calculator 245 additionally uses data from a slippage detection system 263. Slippage detection 263 in one embodiment detects movement of the headset/goggles on the user's head with respect to the user's body, to identify slippage or other shifting which displaces the real location of the user's eye from the calculated location. In one embodiment, the position calculator 245 may compensate for such slippage by adjusting the calculated location used by the system to position the steerable display. In one embodiment, slippage detection is also used to ensure that the display is adjusted to provide parallax for multi-focal display steerable display 210.

The processing system 240 in one embodiment further includes position validator 247 which validates the positioning of the position elements 226, 236, to ensure that the steerable displays 220, 230 are at their intended position. In one embodiment, the position elements 226, 236 contain local sensing and control mechanisms that set the foveal display to the calculated position and then maintain the foveal display at that position until a new target position is set. In one embodiment, the position of the steerable element is sensed using optical sensing. In one embodiment, the position of the steerable element is sensed using magnetic positional elements. The sensing mechanism may be a camera, in one embodiment. The sensing mechanism may be gearing in one embodiment. The sensing mechanism may be another type of sensor that can determine the position of an optical element. Other mechanisms may be used to locally sense the position of the steerable element.

In one embodiment, the foveal position validator 247 validates that the actual position of the foveal display matches the position for which the steerable image display was generated by obtaining real position data from local sensing and control mechanisms for position elements 226 and 236 and comparing them to the target position from positioner 265. In one embodiment, if the foveal position validator 247 reports that the actual position of the steerable display is not within the accuracy threshold of the target position, the processing system 240 may alter the display to provide the appropriate image data. This is described in more detail below.

In one embodiment, data from eye tracker 242 can be used by eye movement classifier 260 to predict where the user's gaze vector will move based on identifying the direction and type of eye movement. This data may be used by positioner 265 to move the steerable display 220, 230 based on the next position of the user's gaze vector. In one embodiment, positioner 265 may utilize user data such as eye movement classification and eye tracking to predictively position the displays 220, 230. In one embodiment, positioner 265 may use the classified eye movement to time the move of the display to minimize the perception of movement by the user. In one embodiment, positioner 265 may additionally use data about upcoming data in the frames to be displayed to identify an optimal positioning for the displays 220, 230.

In one embodiment, positioner 265 may position the display 220, 230 at a position not indicated by the gaze vector. For example, if the displayed frame data has only a small amount of relevant data (e.g. a butterfly illuminated on an otherwise dark screen) or the intention of the frame is to cause the viewer to move their gaze to look in a particular place on the display. Other environmental or contextual reasons for the position may be used. In another embodiment, the positioner 265 may adjust the steerable displays' position to ensure that the foveal and field displays blend well, or to otherwise reduce or eliminate visual artifacts. In another embodiment, the positioner 265 may reposition the steerable displays 210 to match the display image to elements of the scene or other external features.

The processing system 240 may further include a cut-out logic 250. Cut-out logic 250 defines the location of the steerable display 220, 230 and provides the display location information to the associated field display 285. The field display 285 uses this data to generate the field display image including a cut out in the field display corresponding to the portion of the field display replaced by the steerable display. Alternatively, the image may be "cut out," that is the full image may be rendered, and the cut-out portion of the image may be discarded prior to display.

Having a cut-out ensures that there is no interference between the steerable display image and field display image. In one embodiment, when there is a cut-out, blender logic 255 blends the edges of the cutout with the edges of the steerable image positioned within the cut-out area to ensure that the transition is smooth.

In another embodiment, the steerable display 210 may be used to display a sprite, a brighter element overlaid over the field image. In such a case, neither the cut-out logic 250 nor blender logic 255 is used, in one embodiment. In one embodiment, the cut-out logic 250 and blender logic 255 may be selectively activated as needed.

In one embodiment, while the system moves the steerable display 210, display elements 222 and 232 are not shown. In one embodiment, the displays are not shown by extinguishing the light sources to the steerable displays to prevent the user from perceiving the movement of the display 220, 230 and associated visual artifacts such as blur, color break up, brightness flashes, etc. In one embodiment, the right display 220 and left display 230 may be controlled asynchronously for on-time movement.

In one embodiment that is not shown, when the steerable displays 210 are not shown, the processing system 240 uses field display fill-in logic 256 to fill the cut-out hole in the field display to prevent the user from perceiving an artifact, or a hole, in the display. In one embodiment, the fill-in data is based on the data originally generated for the field display and cut out. In one embodiment, the fill-in data is based on the data originally generated for the steerable display. In one embodiment, the fill-in data is a mix of the data generated for the field display 285 and the steerable display 210. The field display fill-in logic 256 in one embodiment uses a variety of filtering techniques including blur, anti-aliasing, dithering, alpha blend, etc., to adjust the fill-in data, such that the user does not perceive that the cut-out hole is temporarily being filled by a different display source.

In one embodiment, the system may utilize an asynchronous steerable display 210 with an independent asynchronous additional display 280. In this case, in one embodiment, scheduler and synchronization logic 272 synchronizes the displays. In one embodiment, the independent additional display 280 is synchronized with the adjustable mirror, or other positioning element of the steerable display 210. This results in the synchronization of the displays. The additional display 280 may receive positioning data. This process is described in more detail below. In another embodiment, the additional display 280 and steerable display 210 may be synchronous. In such a configuration, scheduler and synchronization logic 272 may be eliminated or its logic may be simplified.

In one embodiment, the processing system 240 may include an optical distortion correction system 275. The optical distortion correction system 275 may adjust an image to add a distortion that increases from the center to the edge of the image. This intentional distortion causes the pixels to correct the distortion, in one embodiment. In one embodiment, optical distortion correction system 275 increases in perceived size moving from the center of the image to the edge. This change in perceived resolution reduces the amount of processing required, as fewer pixels are needed to cover the same angular area of the steerable display image. In one embodiment, the optical distortion correction system 275 is applied to the steerable display image. In one embodiment, such optical distortion may help with the blending between the steerable display 210 and the additional display 280. In another embodiment, the steerable display 210 including the optical distortion correction system 275 could be used without a field display. It also provides for an easier optical design and saves processing on the blending. In one embodiment, such a variable resolution highly distorted image has a large ratio between pixel size at the center and edge. The total FOV of this display may be quite large (such as 180 degrees).

In one embodiment, the optical distortion correction system 275 applies correction to the field display and the foveal display. In one embodiment, for the field display, the optical correction creates a mask of the foveal region, which is either cutout & blended with the foveal display or filled in, depending on timing, as discussed below. The optical distortion correction system 275 applies in one embodiment radial distortion correction for field optics, and color correction.

In one embodiment, the optical distortion correction system 275 blends the edge of the foveal region, applies a radial distortion correction for field optics, applies a homography transform to correct for mirror position, applies radial distortion correction for foveal optics, and applies color correction. In one embodiment, the application of separate radial distortion correction for field optics and foveal optics is unique. In one embodiment, the radial distortion correction for field optics uses a lookup table or spline-fit to re-center the distortion correction based on mirror (or other position element) position. In one embodiment, the homography transform that corrects for mirror position uses a look-up table or spline-fit coefficient from a calibration step. In one embodiment, homography correction is done by RGB color.

In one embodiment, roll-off logic 277 provides a roll-off at the edges of the display. Roll-off in one embodiment may include resolution roll-off (decreasing resolution toward the edges of the display area). In one embodiment, this may be implemented with magnification by the optical distortion correction system 275. Roll-off includes in one embodiment brightness and/or contrast roll off (decreasing brightness and/or contrast toward the edges). Such roll-off is designed to reduce the abruptness of the edge of the display. In one embodiment, the roll-off may be designed to roll off into "nothing," that is gradually decreased from the full brightness/contrast to gray or black or environmental colors. In one embodiment, roll-off logic 277 may be used by the steerable display 210 when there is no associated field display. In one embodiment, the roll-off logic 277 may be part of the field display 285, when there is a field display in the system.

In one embodiment, when the steerable display 210 is a multi-focal display, focal point selector 267 identifies the plurality of focal distances for display and generates the appropriate display data for each focal distance. In one embodiment, in a multi-focal display, a time sequential set of images are displayed at different focal distances. The sequential set of images are displayed at a speed, so they are perceived by the user as a single image having multiple focal distances.

In one embodiment, digital correction system 252 corrects the generated image data to adjust for any distortion due to the multi-focal display. In one embodiment, digital correction system 252, further adjusts the size of each of the images for the multi-focal display so that the blending between the steerable display 210 and the field display 285 remains seamless.

FIG. 3 is a block diagram of one embodiment of the controller and rendering pipeline. In one embodiment, a user pose detector 315 may include one or more of an external camera, one or more sensors such as gyroscopes, motion detectors, and other sensors. In one embodiment, one or more cameras and/or sensors on the headset may be used for the user pose detector 315. This is referred to as inside-out tracking. Alternatively, or additionally, cameras and/or sensors that are not part of the headset may be used for the user pose detector 315.

In one embodiment, the user pose detector 315 may include a "relative" change detector and/or an absolute pose detector. The "relative" change detector detects changes in the pose over time, whereas the absolute position measurement places the user in the 3D space. The data from user pose detector 315 is passed to interrupt generator 320, as well as to field display renderer 330, and metadata system 390.

Interrupt generator 320 generates an interrupt, which is used by scheduler 385 to control the field display renderer 330 and foveal display renderer 340. Interrupt generator 320 receives data from the pose detector 315 and from gaze detector 325. Incoming display (scene) data 322 is passed to the renderers 330, 340. Gaze detector 325 also is coupled to interrupt generator 320 so that it can be used by scheduler 385 to control the foveal display renderer 340, since the foveal display data may need to be altered if the user's gaze moves. The scheduler 385 may also use other triggers to adjust the foveal display renderer 340.

Data from gaze detector 325 is also provided to the composition manager 380. Composition manager 380 manages the combination of the foveal display and the field display to present a seamless image to the user. In one embodiment, the composition manager 380 uses data from the gaze detector 325 to enable the positioning of the cut-out in the field display, to correspond to the position of the foveal display. The renderers 330, 340 render the textures. In one embodiment, the foveal display renderer 340 renders a plurality of depths for a multi-focal foveal display.

Gaze detector 325 also provides data to a position detector and actuator 350 which controls movement of the steerable mirror or other steerable element which enables the positioning of the foveal display 365. The actuator 350 moves the element to position the foveal display 365 appropriately. Foveal validator 355 verifies that the actual position of the foveal display 365 matches the intended positioning for which the image was rendered.

In one embodiment, for a DLP/LCOS/laser scanner system based foveal display, if the position of the foveal display 365 element is incorrect, a fast shut-off element 370 may shut off the illumination (LED or laser or other illumination source) for the foveal display 365. This stops displaying, or extinguishes, the foveal display 365, leaving only the field display 360.

In one embodiment, for an emissive display (e.g. uLED or OLED), fast shut-off element 370 may extinguish, the entire foveal display 365. In one embodiment, stopping the display of the foveal display 365 comprises sending blank image data to the display 365.

In one embodiment, the fast shut-off 370 also sends data to the composition manager 380 which turns off the cut-out for the field display leaving a complete field display, while the high-resolution foveal display 365 is not available. In another embodiment, the cut-out may be filled with fill-in data. In one embodiment, the fill-in data for the cut-out in the field display 360 may be based on image data rendered for the field display, the foveal display, or a combination of the field and foveal displays.

In one embodiment, composition manager 380 selects which data is valid for display in the cut-out in the field display 360 based on the information from the foveal validator 355. When the foveal display's position is correct, the current foveal texture from foveal display renderer 340 is used.

When there is no current foveal texture data for the position, in one embodiment re-projected field display data may be used. In some instances, previous foveal texture data may be used. The composition manager 380 ensures that the cut-out, when it exists, is filled by data, based on the accuracy and availability of data from the various sources.

The data from renderers 330, 340 go to the respective compositors 335, 345. In one embodiment, the compositors 335, 345 may be asynchronous. In one embodiment, renderers 330, 340 may be on a separate clock, and work at a different frequency than compositors 335, 345.

The field display 360 displays the right eye and left eye field image, while the foveal display 365 displays the right eye and left eye foveal image. In one embodiment, as noted above, the foveal image and/or the field image may have multiple focal planes, or depths. In that embodiment, the frame data generated by compositor 335, 345 may include a sequence of image elements, associated with the plurality of focal distances. The sequence may be a time sequence. In another embodiment, the focal distances may be based on position, rather than time. In one embodiment, the foveal image and/or the field image may have a variable focus.

In one embodiment, the synchronizer 375 ensures that the asynchronously generated frame data from the field display and foveal display are correctly lined up. In one embodiment, synchronizer 375 uses time stamps from a graphical processing unit to reconcile the various time domains. In one embodiment, synchronizer 375 synchronizes to the device with the greatest latency in the system to drive rendering decisions.

Metadata system 390 can generate metadata and attach it to rendered data, composited data, and/or frame data, in one embodiment. This metadata can be used in various ways. In one embodiment, metadata can be used to make a late update or reprojection right before the displays turn on. Metadata can be used to account for changes in gaze, pose, or mirror position between when the frame was rendered and when it is about to be displayed. Thus, the metadata system 390 receives data from a variety of systems in one embodiment including user pose detector 315, gaze detector 325, position detector & actuator 350, and foveal display renderer 340.

As noted above, in one embodiment, the compositors 335, 345 run at a different update rate vs the renderers 330, 340. The foveal display renderer 340 over-renders the foveal/field regions and metadata system 390 tags it with metadata, representing the gaze, pose, and/or mirror position associated with the rendered content.

When the foveal data is going to be displayed, the foveal display compositor 345 compares the metadata to the latest pose, gaze, and/or position measurements and uses the difference to select the appropriate portion of the over-rendered texture and send it to the foveal displays 365.

In one embodiment, metadata system 390 may be used to indicate one or more regions of interest. In one embodiment, some points in the scene are scored as higher regions of interest than other points in the scene. These regions of interest may be used to limit the valid gaze points to what is tagged in the meta data.

In one embodiment, the metadata system 390 may be used to tag several regions in the scene that are foveated.

In one embodiment, the metadata system 390 may be used to stamp a frame with upcoming information, when playing video content. This can be useful to let the system know if any changes are coming down the pipeline.

In one embodiment, metadata can contain steering information for the steerable display so it could be sent down to the mirror control system in the same time domain as the frame information itself.

In one embodiment, the metadata may also be used for micro corrections for the mirror.

In one embodiment, metadata system 390 may be used in a part of a local relative eye tracker that keeps track of eye movements and uses the historical data it has tracked since the frame was rendered to send a new mirror position and/or crop the data in the frame as a late update.

In one embodiment, metadata system 390 may provide late update priority to some objects in the scene, e.g. if an object needs to be fixed to a real world object, it gets priority over the rest of the scene.

Figure 4A:
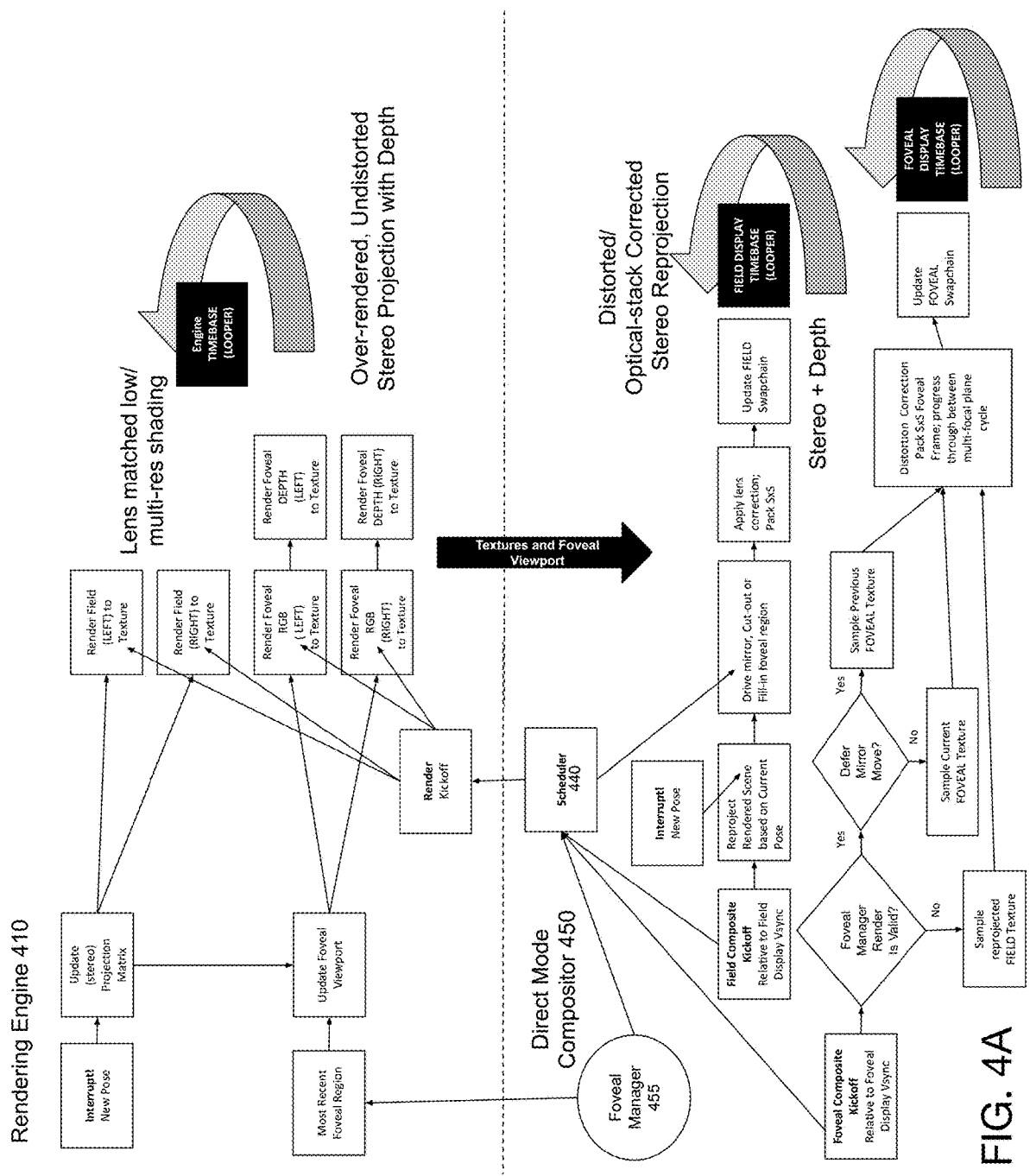
FIG. 4A is a flowchart of one embodiment of the rendering engine and compositor systems.

FIG. 4A is a flowchart of one embodiment of the rendering engine and compositor systems. The system includes a rendering engine 410 and a direct mode compositor 450.

In one embodiment, the rendering engine 410 has its own timebase, and the compositor 450 has a separate timebase. In one embodiment, the compositor 450 has separate timebases for the two displays, the field display timebase (Vsync-Field) and the foveal display timebase (Vsync-foveal). This means that in one embodiment each of the elements can run at different speeds, and refresh rates, using separate time bases. In one embodiment, the data and displays with separate time bases can be synchronized with the use of a synchronization block that maintains presentation synchronization of the various displays. Presentation synchronization in this context means that the displayed content from the two displays is perceived as synchronous by the user.

In one embodiment, this also enables the rendering engine 410 and compositor system 450 to be operating at different rates. In one embodiment, the compositor 450 is faster than the rendering engine. In one embodiment, the rendering engine 410 operates at a variable number of frames per second, and the compositor 450 operates at two different frame rates, one for the field display and another for the foveal display.

In another embodiment, the compositor and rendering systems are synchronized and run in the same time base. In one embodiment, all of the displays are synchronized and run in the same time base. In one embodiment, the displays run on the same clock to ensure they stay synchronized. In one embodiment, the displays may run at the same update rate. In another embodiment, one display may have a display update rate that is an integer multiple of the other display's rate. In one embodiment, one display may have a display update rate that is asynchronous of the other display's update rate. In one embodiment, the field and foveal displays are each a portion of a single, larger display.

In one embodiment, the rendering engine 410 processes data continuously. The rendering engine 410 is driven by the rendering engine timebase loop, rendering textures, and optionally depth for multi-focal displays, as new display data is received for rendering.

In one embodiment, a stereo projection matrix in the rendering engine 410 is interrupt driven, receiving an interrupt when a new pose is detected. A pose defines the user's location in three-dimensional space, including position and orientation. In one embodiment, a pose has six degrees of freedom. Whenever a new pose is detected, the interrupt is sent to the stereo projection matrix of the rendering engine 410.

In one embodiment, the interrupt triggers an update of the projection matrix which defines the field display. The field display left and right displays are rendered to texture.

In one embodiment, the update to the stereo projection matrix also triggers an update to the foveal viewport. The foveal viewport is the area of the field display that is considered the "foveal area" which is rendered at a higher resolution by a separate display, the foveal display, as discussed above. When the foveal viewport is updated, it triggers a re-rendering of the left and right image/texture and depth data for the foveal display. The foveal left/right data and field left/right data, and viewport data, are passed to direct mode compositor 450.

In some embodiments, various other processes can trigger an update to the foveal viewport, including changes in the displayed data, operating-system level changes, changes in scene content, environmental elements, events, and/or other triggers. Any such triggers in one embodiment update the rendering of the foveal data.

In addition to being triggered by a new pose, the rendering engine 410 may trigger an update of the foveal viewport based on data from the foveal state machine 455. The foveal state machine 455 is used to trigger the rendering engine 410 and compositor 450 when the user's gaze vector changes, to ensure that the foveal display is correctly positioned and displays the high-resolution image in the correct location.

In one embodiment, scheduler 440 controls the various elements, and triggers the actual rendering via render kickoff. In one embodiment, scheduler 440 receives data from field composite kickoff and foveal composite kickoff.

The compositor 450 in one embodiment is also triggered by an interrupt when a new pose is detected. In one embodiment, the field display is interrupted when new pose data is received, when new texture data is received, or when there is an offset relative to the field display Vsync-Field. The compositor 450 receives textures and foveal viewport data from the renderer 410.

In one embodiment, the field display timebase is Vsync-Field, which in one embodiment has a period of 11 ms (90 Hz). In one embodiment, the range is 60 Hz to 180 Hz. In one embodiment, when a new pose is detected, or new render data is received from the rendering engine 410, the rendered scene is re-projected based on the current pose.

In one embodiment, the foveal manager 455 is used to drive the foveal display, to update the position and content of the foveal display when the gaze vector changes. The foveal manager 455 also provides the gaze vector data to the scheduler, and thus the field display compositor, so that the field display compositor knows the position of the foveal display. The foveal manager 455 further provides this data to scheduler 440.

This enables the field display compositor to identify the appropriate region of the field display for cut-out for the foveal display. In one embodiment, the field display data is cut-out when the foveal display is correctly positioned and ready to display and filled-in when the foveal display is not correctly positioned or does not have appropriate data for display. This data to position the cut out in the field display is based on the data from the foveal manager 455.

Lens correction is applied, in one embodiment. In one embodiment, the lens correction enables simplified optics by utilizing software correction in the rendering pipeline to correct for distortion. In one embodiment, the system may use a dynamic distortion map. In one embodiment, the correction may include correction for radial distortion, pincushion barrel distortion, chromatic aberrations, and other distortion. In one embodiment, the field frame is then packed.

The field display swapchain is then updated, in one embodiment. In one embodiment, the swapchain is a physical buffer including a front and back buffer. In one embodiment, the field compositor writes to the back buffer, while the front buffer is sent to the display. In one embodiment, the field compositor writes to the front buffer directly during the blanking period. In another embodiment, the swapchain is a virtual frame buffer used for the display. In another embodiment, another type of buffer may be used, or the image rendered may be projected directly.

Simultaneously, but not synchronously in one embodiment, the foveal display receives an interrupt, and the foveal composite kickoff triggers the compositor. The foveal display uses a Vsync-foveal, which may be asynchronous with Vsync-Field driving the field display, in one embodiment. In systems with multiple asynchronous subsystems, the system may determine which subsystem(s) will drive the global synchronization. In one embodiment, the display with the greatest latency in the system drives rendering decisions, and the resulting foveal display repositioning/updates. In another embodiment, the field display and the foveal display compositors may be synchronous, e.g. Vsync-foveal may be the same as Vsync-Field. In another embodiment, the field display and the foveal display may be two portions of a single display. In this case the field display and the foveal display may share the same Vsync signal. In one embodiment, the single display may have two portions, and the field and foveal portions of the display are optically isolated from one another. In one embodiment, the optical isolation may be an area which is black.

The foveal manager 455 determines whether the foveal render, received from rendering engine 410, is valid.

The foveal render (which in one embodiment includes foveal RGB, viewport, and texture, received from rendering engine 410) is valid when there is no change or only a small difference between the position for which the foveal data was rendered and the current foveal position. The foveal render is valid if the area rendered in the current foveal data overlaps the actual position of the foveal display completely, or nearly completely.

In one embodiment, the foveal area is over-rendered by the rendering engine 410. This over-rendering helps when the compositor is operating at a higher frequency than the renderer and can be used for reproduction of small mirror moves. In one embodiment, this provides some flexibility for inaccurate mirror movement or eye tracking. In one embodiment, the over-rendering may be up to 50% of the foveal area. In one embodiment, the over-rendering may be asymmetric, based on expected eye movements, e.g. predictive over-rendering. In one embodiment, the over-rendered region may be used to allow the compositor to composite a new scene without re-rendering the scene for small mirror movements.

In one embodiment, if the foveal render is valid, a fast path to display is used.

If the foveal render is valid, and the mirror move does not need to be deferred for the foveal display to be correctly positioned in time to display the data, the current foveal texture is sampled. In one embodiment, the system applies distortion correction, and packs the foveal frame.

In one embodiment, distortion correction provides software correction for the distortion caused by a steerable mirror or display element. This enables simplified optics. In one embodiment, software correction of distortion can correct for the differential in distortion based on the movement of the mirror or other steerable display element. In one embodiment, distortion changes as the mirror/element moves. By pre-warping the data, prior to packing the frame, the system can use software distortion correction. In one embodiment, the system can provide different corrections for different parts of the image, based on the mirror/element positioning.

In one embodiment, the system may use a dynamic distortion map, based on the position of the mirror/element. By creating a dynamic distortion map, the system can apply distortion correction based on the known position of the mirror/element. In one embodiment, the dynamic distortion map may be precalculated, and applied based on a lookup table. In another embodiment, the dynamic distortion map may be continuously evaluated from a polynomial spline or other mathematical model.

There may be multiple sources of distortion for the foveal display. In one embodiment, there are optical components between the display panel and the steering element. The optical elements introduce distortion that is independent of the steering position. This type of distortion can be referred to as projector distortion. In one embodiment this distortion is radial. In one embodiment this distortion may be described by a 2D interpolating polynomial, or another 2D function. The position of this distortion is fixed relative to the foveal field of view. In one embodiment, the software distortion correction can also be used to correct for the projector distortion.

Changes to the steering position introduce a transformation that can be described by a homography matrix and is dependent on the steering position. This type of distortion can be referred to as homography transform. In one embodiment, the software distortion correction can also be used to correct for the homography transform distortion.

In one embodiment there are optical elements between the steering element and the user's eye. These elements also introduce a distortion. This distortion is fixed relative to the total steerable range of the system and does not move with the foveal field of view as the system is steered. This type of distortion can be referred to as scan distortion. In one embodiment the scan distortion is radial. In one embodiment this distortion may be described by a 2D interpolating polynomial, or another 2-D function.

These sources of distortion each can be corrected for with their own correction. In one embodiment, the distortion is corrected mathematically by transforming coordinates on the display panel to coordinates on the intended image. In one embodiment, all three sources of distortion are present and the correction for the projector distortion is applied first, followed by a homography transform. The homography transform also corrects for any rotational misalignment of the foveal display panel. The correction for the scan distortion is applied last, in one embodiment.

In one embodiment, both the projector distortion and the scan distortion can be further broken into multiple radial distortions. This may be done either for computational efficiency or to account for misalignment among the optical elements. Being able to apply these distortion corrections allows the design constraints of the optical system to be relaxed. In one embodiment the total distortion of the system may be as high as 50% at the edge of the foveal field of view, and the rotational misalignment of the panel may be up to 180 degrees.

In one embodiment there are separate image corrections for the different focal planes. In one embodiment the image corrections include distortion correction, color correction, brightness/vignetting corrections, temporal filtering, blurring, and dithering. In one embodiment, all of these corrections are applied in one pass to a given focal plane. In another embodiment one or more of these corrections are applied separately or independently.

In one embodiment, the data alternates between the multiple focal planes for the foveal display, if the foveal display is multi-focal.

The data is packed for the swapchain.

The foveal swapchain, or another buffer, is then updated.

Returning to the foveal manager's determination of whether the rendering is valid, if the foveal render is valid, but the mirror movement is deferred, in one embodiment the previous foveal texture is sampled. The mirror movement may be deferred, in one embodiment, because the mirror cannot reach the intended position and settle there in the timeframe required to correctly display the foveal image. The mirror movement may be deferred, in one embodiment, because the event deadline which triggers the move command, is missed.

Because the mirror movement was deferred, the updated render, which is based on the projected new position of the mirror is inaccurate. Therefore, the previous foveal texture is sampled, and the field display's cutout position is matched to the actual location of the cut-out based on the delayed movement of the mirror.

Mirror deferment can happen when the foveal render is valid for a variety of reasons, including but not limited to:

pipeline delay wherein the mirror move is deferred to align the mirror move with when the updated foveal image will be displayed to the user;

the mirror is not ready for a new positional movement;

moving the mirror at this time would degrade the user's visual experience;

content in a scene being used to dictate mirror position, and the content of interest does not positionally align with the latest rendered foveal frame;

the user's gaze has reverted back to the previous location;

a false gaze move was detected;

a large saccade has been detected and the system is preparing for a large mirror move, or changing mirror move size;

the host system detects it has missed the timing deadline to send the move mirror message down to the mirror;

new pose data have arrived indicating the mirror should not be moved;

etc.

When the render is valid, but the mirror move is deferred, the sampled previous foveal texture is passed to distortion correction.

If the foveal manager determines that the foveal render is not valid, it means the foveal render data cannot be used, and the image should be re-rendered in the correct location. In one embodiment, this is referred to as the slow path because the rendering engine must re-render the foveal image. In one embodiment, the foveal display may resample from one or both the re-projected field texture and the foveal texture to display the foveal image. In one embodiment, if the actual foveal area does not overlap the rendered data, the system may turn off the foveal display and utilize the field display only. In one embodiment, the fast LED shut-off technique discussed above is used.

As noted above, both the composited field display data and foveal display data are packed into a frame. In one embodiment, the image data for the right and left are packed into a single display frame. In one embodiment, the frame packing formats may vary. In one embodiment, the frame packing may pack the left image and the right image into a single display frame. In one embodiment, all four data sets (left and right for field display and left and right for foveal display) may be packed into a single frame. In one embodiment, each data set (left and right for field display and left and right for foveal display) is packed into its own separate frame.

In one embodiment, the system may use a custom interlacing for the frame packing, to account for the relative size of the field display and foveal display. In one embodiment, the foveal display may be 720×720, while the field display is 1280×720. The frame packing may be packed as a 2000×720 frame, encompassing both. A field programmable gate array (FPGA), application specific integrated circuit (ASIC), system-on-a-chip (SOC), or other processor may be used within the display controller to unpack the frame data for display.

In one embodiment, the field and foveal displays for a single eye are each a portion of a single display. In this case, the field and foveal display images may be packed into a single larger frame, where the larger frame is the size of the display panel. For example, the entire display for an eye may be a 1280×720 panel, and the field display could be packed into a 640×720 section on the left side of the panel, and the foveal display could be packed into a 640×720 section on the right side of the panel. In another embodiment, the field and foveal displays do not have the same resolution. In another embodiment, the combination of the field and foveal displays does not use up the entire display panel. In this embodiment, in one embodiment, the unused pixels could be black, or optically blocked in the system, allowing for optical separation between the field and foveal displays. In one embodiment, the unused portion of the display panel may be physically blocked. This may provide an improved contrast ratio.

Some of the frame packing approaches that may be used include:
  stereo left/right color for field (into one display frame);
  stereo left/right color for foveal (into one display frame) at time T0 for focal plane 0 and alternately sends to foveal display; and
  stereo left/right color for foveal (into one display frame) at time T1 for focal plane 1 and alternately sends to foveal display.

In another embodiment, the packing level may be different. For example, in one embodiment, all rendered textures (color+depth) get packed and sent together to one device with multiple displays (essentially compositing on device including depth to focal plane conversion). In another embodiment, all post-composited textures get packed into a single frame and sent to one device (device presents field and focal planes for T0 and T1 sequentially after unpacking). In another embodiment, all post-composited textures for a single time T0 or T1 above get sent together to one device and the host sequences. In another embodiment, all foveal textures (for multiple planes) get packed together instead of sent time sequentially, but field textures are sent independently, and the device sequences the planes. In one embodiment, textures for all focal planes for stereo left/right all get sent independently (essentially no packing). In one embodiment, the packed frame data may contain only a subset of the entire frame. In one embodiment, the frame data may be compressed.

Figure 4B:
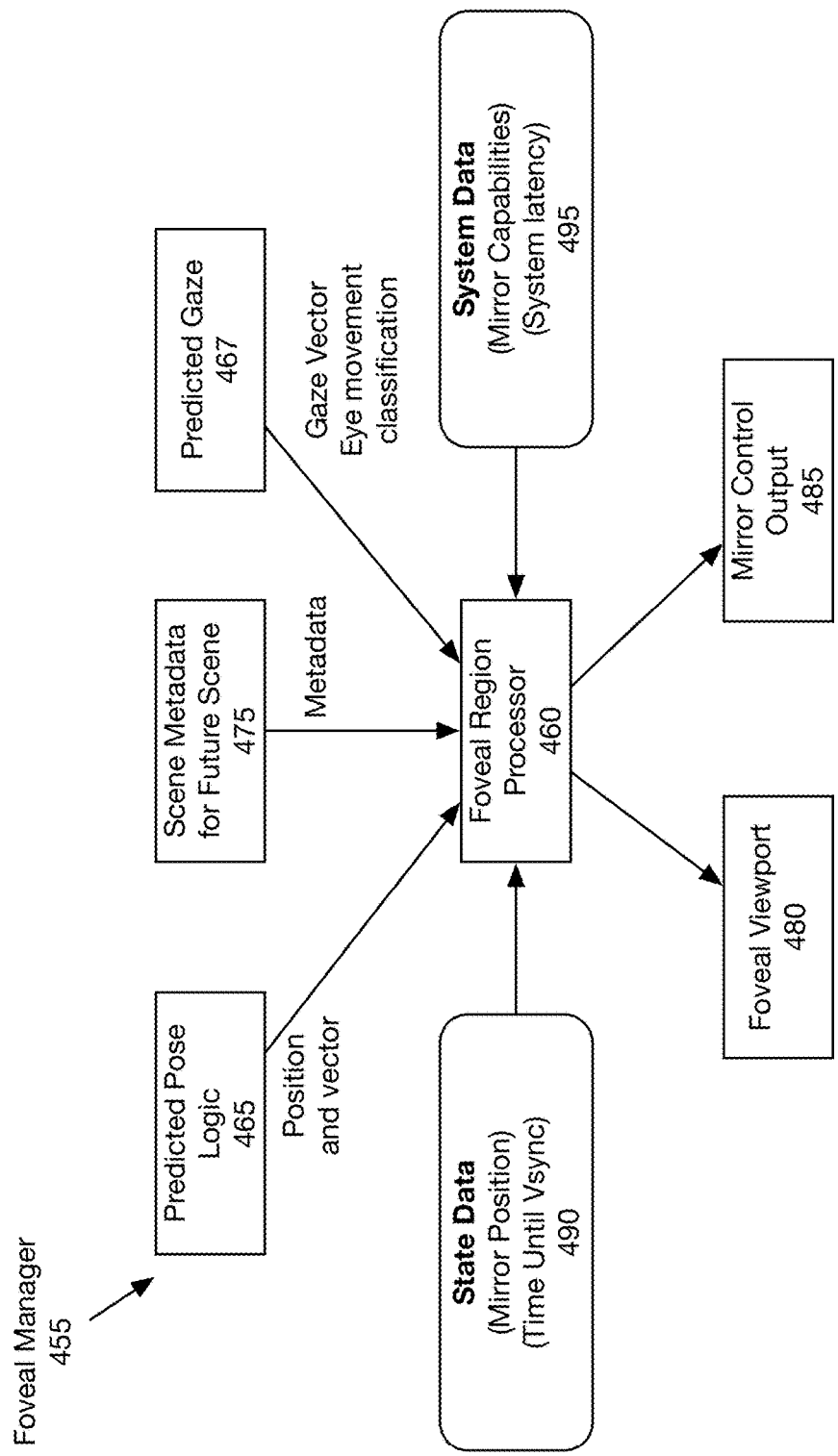
FIG. 4B is a logic diagram of one embodiment of the foveal manager.

FIG. 4B is a block diagram of one embodiment of the elements of the foveal manager 455. The foveal region processor 460 utilizes system data 495 which describe the system and mirror capabilities and latencies, and state data 490, which include the current mirror position and time until Vsync, and other data which describes the current state of the system. In one embodiment, foveal region processor 460 receives position and vector data from predicted pose logics 465, scene metadata for upcoming scene(s) 475, and gaze vector and eye movement classification from predicted gaze system 467. The foveal region processor 460 utilizes this data to calculate the foveal viewport 480, and mirror control output 485.

In one embodiment, foveal region processor 460 utilizes real time inputs to generate real time outputs. However, the foveal region processor 460 can utilize analysis based on the various data inputs to determine where the foveal display should be directed. In one embodiment, the system uses machine learning to calculate the best position and data for the foveal display. The foveal region processor 460 uses advanced filtering to eliminate unproductive moves, based on the data available to it, including state data, system data, and upcoming scene data/predicted gaze and pose data. In one embodiment, the advanced filtering is specific to a particular use case. In one embodiment, the advanced filtering is specific to a user. In one embodiment, the foveal region processor may make the determination of what and where to display to reduce artifacts/optimize visual quality. Other factors, such as reduction of mirror movements, reducing eye strain, and reducing power consumption may also be taken into account by the foveal region processor, in determining the foveal view port 480, and associated mirror control output 485.

In one embodiment, the foveal region processor 460 receives a request to do XYZ in the future, e.g. display the foveal region data in a particular location. The foveal region processor 460, based on the inputs above, determines what it will do, e.g. X'Y'Z' by time A'. This data is fed back to the rendering engine, to render the X'Y'Z' data, for availability to the foveal display by time A'.

FIGS. 5A-5B are flowcharts of one embodiment of the eye tracking and mirror control in the system. FIG. 5A illustrates one embodiment of the host CPU and eye-tracker flow, while FIG. 5B illustrates one embodiment of the corresponding headset microcontroller unit (MCU) and mirror control flow.

The process starts at block 505 when new eye tracking data is received. At block 510, the data is filtered, and a new gaze vector is calculated.

In one embodiment, the data is then analyzed. In one embodiment, the eye movement is classified. In one embodiment, the classification may include movements such as saccade and smooth pursuit. In one embodiment, the time elapsed since the last mirror move is also analyzed, and the system determines whether the user experience will be degraded if the mirror is moved.

The system then decides whether to move the mirror, at block 515, based on whether the user experience will be degraded/improved if the mirror is moved. If the determination is to not move the mirror, at block 520, the process ends. The mirror is not moved, and a new frame is not generated to be displayed.

If the determination is to move the mirror at block 515, the process at block 522 determines whether the mirror move should be deferred. The mirror move may be deferred, as discussed above, due to data limitations, physical limitations, or other reasons. If at block 522 the process determines to defer the move, at block 524, the mirror move is deferred for the period needed. In one embodiment the mirror move may be deferred for one frame. After the deferral ends, the process returns to block 525. If the move is not deferred, at block 522, the process continues directly to block 525.

At block 525, the process sends the new foveal region data to the renderer. The renderer renders the latest foveal region at block 530. This is done asynchronously with the mirror movement, in one embodiment.

When the move instruction is received, and in one embodiment in parallel with sending the new foveal region data to the renderer, the system sends the new mirror coordinates to the headset, at block 535. In one embodiment, the data sent to the headset includes a move mirror command, with destination coordinates. In one embodiment, the data also includes the mirror move deferral data, which specifies the length of the mirror delay. The mirror delay is the time until the mirror movement should be initiated. In one embodiment, the mirror delay also includes the time until the foveal display should be stopped. This delay can be referred to as the move deferment time.

In one embodiment, the position and the mirror delay (if any) are calculated based on the eye movement classification and gaze data. This data is sent at block 537 along with the new mirror coordinates to the headset MCU & mirror control. In one embodiment, during the mirror move the foveal display is extinguished.

Because in one embodiment the mirror movement results in a temporary lack of availability of the foveal display, at block 540, the hole in the field display at the old location for the foveal display is filled. In one embodiment, the system looks up how many field display frames to fill, based on the magnitude of the mirror movement, and the stackup of display presentation times. In one embodiment, the length of time for the movement of the mirror and for settling time are calculated using a lookup table. In one embodiment, the mirror settling signal indicating that the movement in the mirror is within the settling threshold, and thus the foveal display is available for use, may be sent back from the headset MCU (see block 585) to close this loop.

In one embodiment, the data sent to the headset MCU and mirror control includes settling criteria, which defines when the mirror has reached its destination and the foveal display can safely be displayed without degrading the user's experience. In one embodiment, this settling criteria includes positional accuracy data as well as the amount of time that the mirror must be within the accuracy limits of the target destination.

In one embodiment, the settling criteria is set dynamically. The settling criteria may be dynamically determined based upon the size of a steering move, the size of gaze change reported by the gaze detector, content in the scene, etc.

In one embodiment, when the length of time to fill the hole in the field display is 0 frames the field display never fills the hole in the field display, a bypass path is used, at block 542, moving directly to block 555.

In one embodiment, the fill-in data may be rendered field display data, the rendered foveal data, foveal data from a prior frame, reprocessed field display data, or a combination of the above types of data.

In one embodiment, the filling utilizes a progressive brightness fill and unfill, at block 545. In one embodiment the filling may use one or more filtering methods at block 545 such as anti-aliasing, spatial dithering, temporal dithering, blur, etc. The various filtering methods used to fill the field display are designed to prevent visual artifacts during the fill process, such as flashes caused by a sudden change in brightness in low persistence displays. In one embodiment, a progressive blending is utilized to minimize visual artifacts at the end of a saccade as saccadic masking rolls off.

Low-persistence displays are only turned on for a small portion of a frame, for instance 2 ms of an 11 ms frame; this is to prevent judder in head mounted displays. Judder can cause unwanted flashes when the field display is filled in right after a foveal frame has been displayed because the flash from the low persistence field display is added to the foveal frame that was previously displayed and the eye sees this combination as too bright. In one embodiment, this flash can be mitigated by reducing the brightness filled in for the field display for the first frame after the foveal display is shut off. In one embodiment, only half the brightness is filled in for the field display in that first frame. In one embodiment, the brightness of the field display may be 10-90% for the first frame. In one embodiment, this means the user perceives an even brightness during the transition. In one embodiment, the field display brightness is ramped up over several frames when the cutout is filled in.

At block 550, in one embodiment the process determines whether enough time has elapsed for the mirror movement. In one embodiment, this determination is made based on a lookup table, which indicates the amount of time for the movement. If not, the process continues to wait. In one embodiment, during the wait the field display is shown with no cut-out as noted above.

Once enough time has elapsed, at block 555, in one embodiment, the process determines whether the foveal image that was generated is correct for the mirror destination. If not, in one embodiment, the process uses data from the previous foveal frame. In another embodiment, the field data may be used. In one embodiment, what data is used depends on what is the most accurate data available for the foveal mirror's actual position, to ensure that there is no location mismatch so it would show up wrong.

Figure 6:
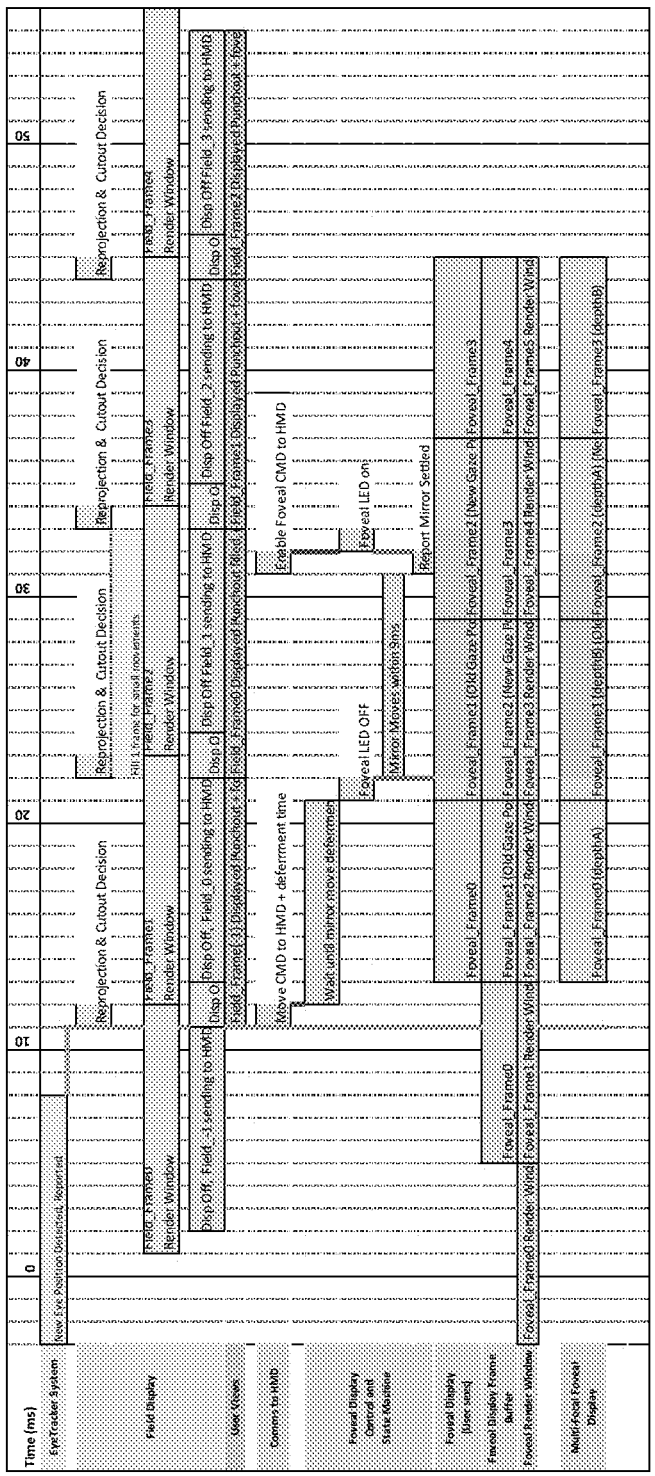
FIG. 6 is timing diagrams showing embodiments of the timing architecture.

Once the foveal image is determined to be correct, at block 560 the foveal hole is punched out of the field display at the new location. In one embodiment, the "enable foveal display" command is sent to the headset at block 565. In one embodiment, these two elements, blocks 560 and 565 are asynchronous. The timing diagram of FIG. 6 provides more detail.

Turning to FIG. 5B, at block 570, the headset MCU receives the move mirror command sent by the host CPU and Eye Tracker at block 537.

At block 571, the process determines whether the mirror movement should be deferred, as determined at block 537. If so, the mirror move and the showing of the foveal display are delayed based on the data provided.

At block 573, in one embodiment, the foveal display is not shown. In one embodiment, the foveal display is not shown because illumination source of the foveal display is disabled. Disabling the foveal display illumination source turns off the foveal display, in effect. In one embodiment, the foveal display may be not shown by being blanked out by sending a blank (black) frame. In one embodiment, instead of disabling the foveal display illumination source or sending a black frame, the system can stop showing the foveal display in another way.

In one embodiment, the movement is delayed long enough to ensure the foveal display is not shown at block 575. In one embodiment, the delay is 1.2 ms. In one embodiment, the delay is less than 4 ms. In one embodiment, there is no delay, because the delay time in sending the "move mirror command" is sufficient to ensure the illumination source is off.

Additionally, the system, at block 577, in one embodiment, looks up the mirror movement control coefficients for this mirror move. These parameters are based on the starting location, size of the movement, and direction of the movement. The direction is relevant in one embodiment, because it can impact the return spring force of the movement. In one embodiment, a PID (proportional, integral, differential) control loop is used. At block 580, the process updates the control loop coefficients and sets a new position target in the control loop. The mirror movement then starts.

At block 583, the movement is undertaken. In one embodiment, the movement used is a fast movement and braking, referred to as bang-bang control. In one embodiment, a short hard turn-on starts the move, to get over the noise floor and then the control algorithm takes over the movement to correctly position the mirror. In one embodiment, at the end of the movement the mirror may have residual vibration.

At block 585, the process determines whether the mirror has settled at the new target destination. In one embodiment, the mirror is considered settled when it is no longer moving or vibrating. In one embodiment, the mirror is considered settled when the remaining mirror movements and inaccuracies relative to the final position do not degrade the visual experience of a typical viewer. In one embodiment, 1-5 arc minutes of movement is considered settled. As discussed above, in one embodiment, the threshold for a settled mirror is dynamic. If the mirror is settled, at block 587, the process determines whether the "enable foveal display" command has been received. This command is received from the host CPU and eye tracker, sent at block 565, discussed above.

If so, at block 580, the illumination source for the foveal display is enabled. At this point the user sees the field display with a correctly positioned foveal display, in a cut-out of the field display.

FIGS. 5A and 5B are flowcharts for steering control in one embodiment of a steerable, foveal display. One of skill in the art would understand how to extend the same system to other, similar embodiments. As described above, in one embodiment, the steerable element is not a mirror. In one embodiment, the host CPU and eye tracker are integrated with the headset MCU and mirror control.

Figure 7:
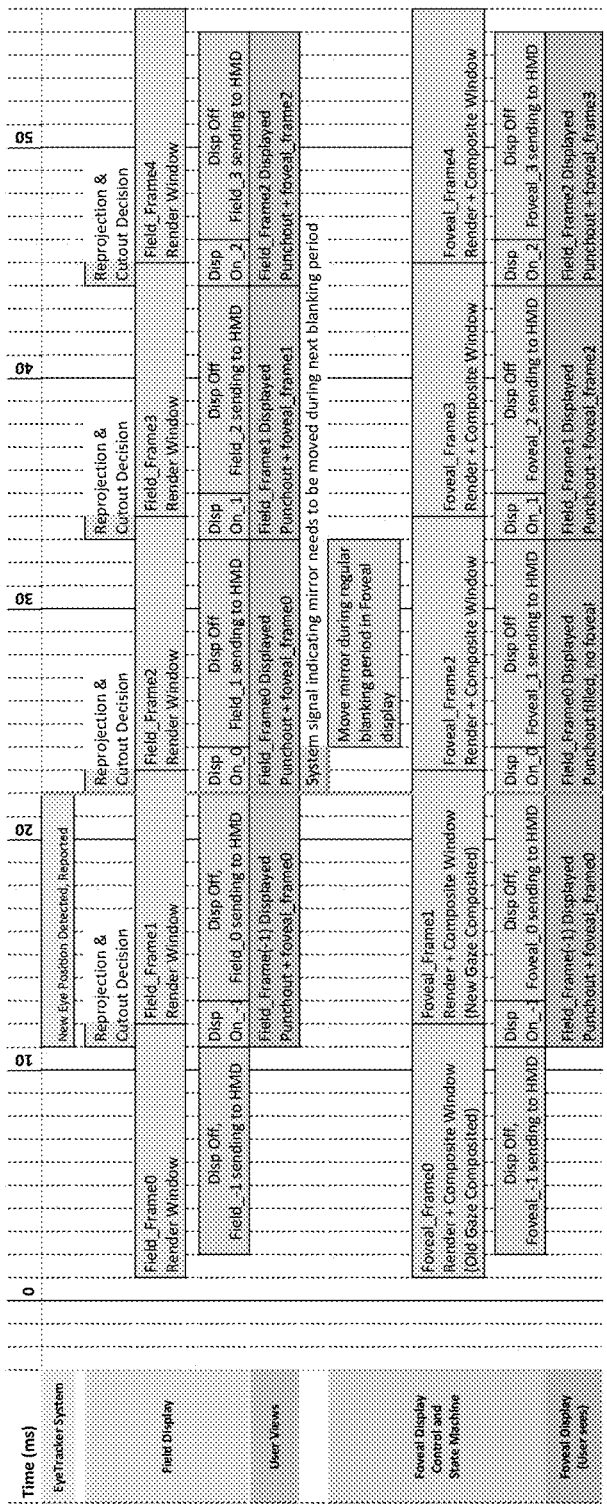
FIG. 7 shows one embodiment of the timing diagram for a synchronous system.

FIGS. 6 and 7 are timing diagrams showing embodiments of the timing architecture.

FIG. 6 illustrates one embodiment of the timing diagram showing the relative timing of actions taken by the eye tracker system, field display, foveal display, foveal display frame buffers, and foveal render window. Additionally, commands to the head mounted display (HMD) and the user views are illustrated.

Note that while the relative timing of commands is based on the relationship between these systems, in one embodiment the field display and the foveal display are on separate clocks and are not synchronized.

FIG. 6 illustrates a 60 millisecond period, after a new gaze vector is reported (from the eye tracker system) for a smooth pursuit type of eye movement. The mirror movement takes 9 ms in this illustration, during which the field frame 0 is displayed with the punchout filled, and no foveal frame being displayed. As can be seen, at time 21 ms, the foveal LEDs are turned off, and at time 32 ms the foveal LEDs are turned back on, after the mirror movement is completed, and the mirror is reported settled.

FIG. 6 also illustrates the duty cycle of the field display. In one embodiment, the field display is lit for 2 milliseconds out of 11 (e.g. there are 9 milliseconds when the field display is dark). This type of duty cycle is known in the art for displays. In one embodiment, the foveal display is continuously displayed without such a duty cycle. In another embodiment, the foveal display may also only be lit for a fraction of the frame in the same way the field display is lit.

In one embodiment, the foveal display has multiple depths, e.g. it is a multi-focal display. In one embodiment, for such a multi-focal display the depths are displayed sequentially, e.g. for frame 0, the first frame portion is depth A, and the second is depth B. Note that while only two frame depths are shown, a multi-focal display may include more than two. In one embodiment of a multi-focal display, frame 0 displays depth A and frame 1 displays depth B.

Unlike smooth pursuit, saccade movement size is highly variable. Therefore, the movement may extend over multiple frames. This means there may be multiple field frames without foveal display. One of skill in the art would understand the extension of the frame display timing shown in FIG. 6 for longer movements.

FIG. 7 shows one embodiment of the timing diagram for a synchronous system. In one embodiment, the system is synchronized, and all subsystems are run on the same time basis, such as on a system-on-a-chip in which a single integrated controller controls all elements of the system. In one embodiment, the foveal display has an off period every frame. In one embodiment, the steerable element is moved during the foveal display's off period such that there is no degradation of the visual experience of the typical viewer when the steerable element is moved. In one embodiment, the field and foveal displays are each a portion of a single, larger display, as discussed above.

In FIG. 7, the field and foveal displays are refreshed synchronously. Additionally, the foveal display has a blanking period. When the steerable element of the foveal display needs to be moved, it is moved during this blanking period. In the example of FIG. 7, a new gaze position is reported at a time of 22 ms. The steerable display foveal display and field display are updated and display the new gaze position one frame, 11 ms, later at 33 ms. In this example both field and foveal displays have a frame rate of 90 Hz.

A synchronous display may also run with the field and foveal displays at integer multiples of each other.

Figure 8:
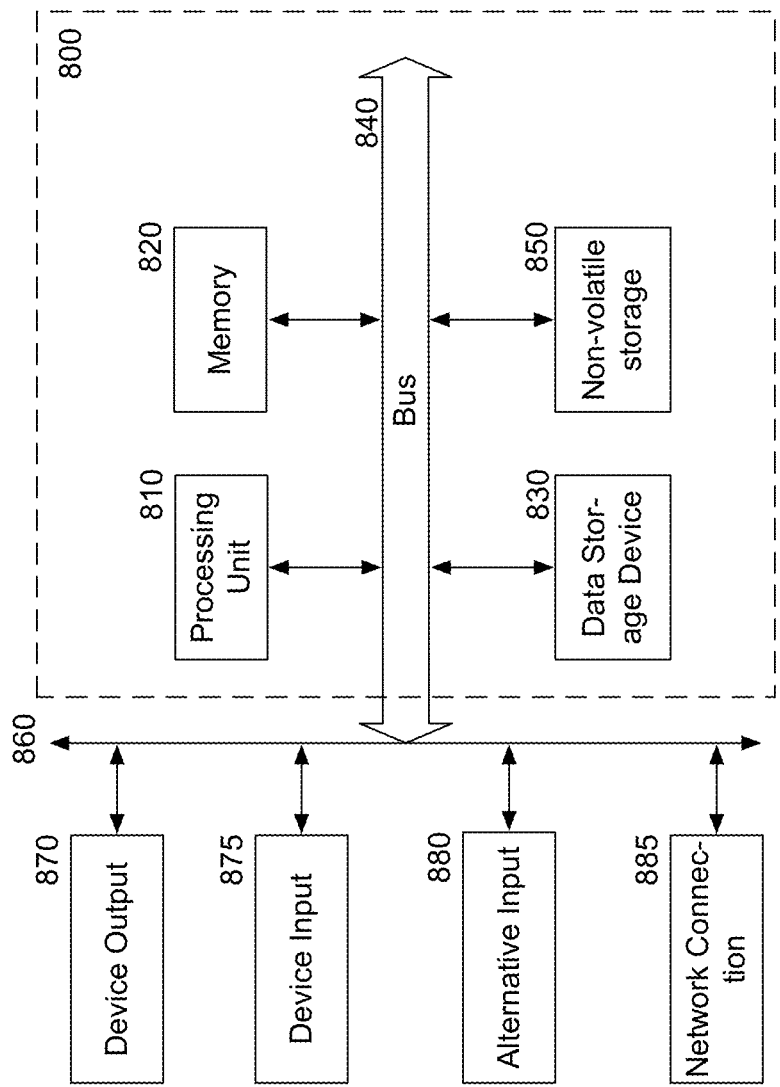
FIG. 8 is a block diagram of a computer system that may be used with the rendering engine.

FIG. 8 is a block diagram of a computer system that may be used with the rendering engine. It will be apparent to those of ordinary skill in the art, however that other alternative systems of various system architectures may also be used.

The data processing system illustrated in FIG. 8 includes a bus or other internal communication means 840 for communicating information, and a processing unit 810 coupled to the bus 840 for processing information. The processing unit 810 may be a central processing unit (CPU), a digital signal processor (DSP), or another type of processing unit 810.

The system further includes, in one embodiment, a random-access memory (RAM) or other volatile storage device 820 (referred to as memory), coupled to bus 840 for storing information and instructions to be executed by processor 810. Main memory 820 may also be used for storing temporary variables or other intermediate information during execution of instructions by processing unit 810.

The system also comprises in one embodiment a read only memory (ROM) 850 and/or static storage device 850 coupled to bus 840 for storing static information and instructions for processor 810. In one embodiment, the system also includes a data storage device 830 such as a magnetic disk or optical disk and its corresponding disk drive, or Flash memory or other storage which is capable of storing data when no power is supplied to the system. Data storage device 830 in one embodiment is coupled to bus 840 for storing information and instructions.

The system may further be coupled to an output device 870, such as a cathode ray tube (CRT) or a liquid crystal display (LCD) coupled to bus 840 through bus 860 for outputting information. The output device 870 may be a visual output device, an audio output device, and/or tactile output device (e.g. vibrations, etc.).

An input device 875 may be coupled to the bus 860. The input device 875 may be an alphanumeric input device, such as a keyboard including alphanumeric and other keys, for enabling a user to communicate information and command selections to processing unit 810. An additional user input device 880 may further be included. One such user input device 880 is cursor control device 880, such as a mouse, a trackball, stylus, cursor direction keys, or touch screen, may be coupled to bus 840 through bus 860 for communicating direction information and command selections to processing unit 810, and for controlling movement on display device 870.

Another device, which may optionally be coupled to computer system 800, is a network device 885 for accessing other nodes of a distributed system via a network. The communication device 885 may include any of a number of commercially available networking peripheral devices such as those used for coupling to an Ethernet, token ring, Internet, or wide area network, personal area network, wireless network or other method of accessing other devices. The communication device 885 may further be a null-modem connection, or any other mechanism that provides connectivity between the computer system 800 and the outside world.

Note that any or all of the components of this system illustrated in FIG. 8 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 820, mass storage device 830, or other storage medium locally or remotely accessible to processor 810.

It will be apparent to those of ordinary skill in the art that the system, method, and process described herein can be implemented as software stored in main memory 820 or read only memory 850 and executed by processor 810. This control logic or software may also be resident on an article of manufacture comprising a computer readable medium having computer readable program code embodied therein and being readable by the mass storage device 830 and for causing the processor 810 to operate in accordance with the methods and teachings herein.

The present invention may also be embodied in a handheld or portable device containing a subset of the computer hardware components described above. For example, the handheld device may be configured to contain only the bus 840, the processor 810, and memory 850 and/or 820.

The handheld device may be configured to include a set of buttons or input signaling components with which a user may select from a set of available options. These could be considered input device #1 875 or input device #2 880. The handheld device may also be configured to include an output device 870 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 810, a data storage device 830, a bus 840, and memory 820, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals but may be configured and accessed through a website or other network-based connection through network device 885.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 810. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A system comprising:
a repositionable foveal display to position a steerable display image having a first resolution;
a field display to provide a field display image having a second resolution lower than the first resolution;
a foveal display controller to determine that the steerable display image should be moved and further to determine whether the foveal display should be extinguished for the move; and
upon determining that the foveal display should be extinguished, a fast shut-off logic to extinguish the foveal display prior to moving the foveal display, and re-enable the foveal display after the foveal display is settled.

2. The system of claim 1, further comprising:
the foveal display controller, upon determining that the foveal display should be repositioned, further configured to determine whether a movement should be deferred, and deferring the movement.

3. The system of claim 1, further comprising:
a rendering engine to render a field texture for the field display and a foveal texture for the foveal display; and
upon determining that the foveal display should be repositioned, determining whether a movement should be deferred, and deferring the movement, wherein when the movement is deferred, the foveal texture from a prior frame is resampled for display.

4. The system of claim 1, further comprising:
a rendering engine to render a field texture for the field display and a foveal texture for the foveal display.

5. The system of claim 4, further comprising:
a compositor to generate frames for the foveal display, the frames using one or more of:
current foveal texture data;
previous foveal texture data; and
field texture data.

6. The system of claim 5, wherein the field texture data used by the compositor to generate the frames for the foveal display is resampled field texture data.

7. The system of claim 5, further comprising:
a metadata system to attach metadata to frame data, the metadata used in rendering the steerable display image; and
wherein the metadata includes pose, gaze, and/or position measurements, and the compositor is further to use one or more of a latest pose, gaze and/or position and the metadata to crop the foveal texture.

8. The system of claim 1, wherein the system is asynchronous.

9. The system of claim 1, further comprising:
a digital correction system to provide distortion correction for an optical stack of the foveal display.

10. A method of displaying a hybrid image, the method comprising:
positioning a steerable display image having a first resolution, the steerable display image generated by a repositionable foveal display;
displaying, by a field display, a field display image having a second resolution lower than the first resolution;
determining that the foveal display should be repositioned;
determining whether the foveal display should be extinguished for the repositioning; and
extinguishing the foveal display prior to repositioning the foveal display, and re-enabling of foveal display after the foveal display is settled.

11. The method of claim 10, further comprising:
upon determining that the foveal display should be repositioned, determining whether a movement should be deferred, and deferring the movement.

12. The method of claim 10, further comprising:
rendering a field texture for the field display and a foveal texture for the foveal display;
upon determining that the foveal display should be repositioned, determining whether a movement should be deferred, and deferring the movement; and
resampling the foveal texture from a prior frame for display when the movement is deferred.

13. The method of claim 10, further comprising:
rendering a field texture for the field display and a foveal texture for the foveal display.

14. The method of claim 13, further comprising:
generating frames for the foveal display, the frames using one or more of:
current foveal texture data;
previous foveal texture data; and
field texture data.

15. The method of claim 14, wherein the field texture data used by a compositor to generate the frames for the foveal display is resampled field texture data.

16. The method of claim 10, wherein the method is implemented asynchronously.

17. The method of claim 10, further comprising:
attaching metadata to frame data, the metadata used in rendering the steerable display image.

18. The method of claim 17, wherein the metadata includes pose, gaze, and/or position measurements, and further comprising:
using a change between a latest pose, gaze and/or position and the metadata to crop the steerable display image.

19. The method of claim 10, further comprising:
applying distortion correction for an optical stack of the foveal display.

20. A method to present a hybrid image comprising:
positioning a steerable display image having a first pixel per degree (PPD) resolution and having a first field of view, the steerable display image generated by a foveal display;
providing a field display image having a second resolution, that has a PPD lower than the first resolution, and a second field of view larger than the first field of view, the foveal display image generated by a field display;
rendering a field texture for the field display and a foveal texture for the foveal display;
generating frames for the field display from the field texture using a field compositor, and frames for the foveal display from the foveal texture using a foveal compositor; and
sequencing and selecting what is presented in the hybrid image including one or more of data in the field display image and the foveal display image.

* * * * *